(12) United States Patent
Fujimoto et al.

(10) Patent No.: US 7,198,846 B2
(45) Date of Patent: Apr. 3, 2007

(54) POLYTRIMETHYLENE TEREPHTHALATE RESIN

(75) Inventors: Katsuhiro Fujimoto, Yokohama (JP); Yoichiro Azuma, Kurashiki (JP); Tsutomu Hisada, Nobeoka (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 10/512,467

(22) PCT Filed: Jun. 13, 2003

(86) PCT No.: PCT/JP03/07567

§ 371 (c)(1),
(2), (4) Date: Oct. 26, 2004

(87) PCT Pub. No.: WO03/106530

PCT Pub. Date: Dec. 24, 2003

(65) Prior Publication Data

US 2006/0058497 A1 Mar. 16, 2006

(30) Foreign Application Priority Data

Jun. 13, 2002 (JP) ............................ 2002-172735

(51) Int. Cl.
*B32B 5/16* (2006.01)
*B29C 47/00* (2006.01)

(52) U.S. Cl. .................. 428/402; 528/308.6; 528/491; 528/503; 525/437; 428/357; 264/177.17; 264/210.1; 264/211.12

(58) Field of Classification Search ................ 528/272, 528/308, 308.6, 491, 503; 428/402, 364, 428/357; 264/176.1, 177.17, 21, 211.12; 525/437

See application file for complete search history.

(56) References Cited

U.S. PATENT DOCUMENTS

| 6,284,370 | B1 * | 9/2001 | Fujimoto et al. | ........... 428/364 |
| 6,316,101 | B2 * | 11/2001 | Kato et al. | .................. 428/364 |
| 6,423,814 | B1 * | 7/2002 | Kato et al. | .................. 528/272 |
| 6,620,502 | B1 * | 9/2003 | Fujimoto et al. | ........... 428/357 |
| 6,620,505 | B1 * | 9/2003 | Abe et al. | ..................... 428/364 |
| 6,645,619 | B2 * | 11/2003 | Kato et al. | .................. 428/359 |

(Continued)

FOREIGN PATENT DOCUMENTS

| GB | 2 409 185 | * | 6/2005 |
| JP | 53-017569 | | 2/1978 |
| WO | WO00/64962 | | 11/2000 |
| WO | WO02/062868 A1 | | 8/2002 |
| WO | WO 2004/065451 | * | 8/2004 |

(Continued)

*Primary Examiner*—Samuel A. Acquah
(74) *Attorney, Agent, or Firm*—Staas & Halsey LLP

(57) ABSTRACT

A polytrimethylene terephthalate resin comprising: 90 to 100 mole % of trimethylene terephthalate recurring units, and 0 to 10 mole % of at least one monomer unit obtained from a comonomer other than the monomers used for forming the recurring units and copolymerizable with at least one of the monomers used for forming the recurring units, which resin has the following characteristics: (A) an intrinsic viscosity [η] of from 0.8 to 4.0 dl/g; (B) an Mw/Mn of from 2.0 to 2.7; (C) a psychometric lightness L-value (L-1) of from 70 to 100 and a psychometric chroma b*-value (b*-1) of from −5 to 25; and (D) a psychometric lightness L-value (L-2) of from 70 to 100 and a psychometric chroma b*-value (b*-2) of from −5 to 25 as measured after heating the resin at 180° C. for 24 hours in air.

20 Claims, 6 Drawing Sheets

U.S. PATENT DOCUMENTS

| | | |
|---|---|---|
| 6,652,964 B1 * | 11/2003 | Kato et al. .................. 428/364 |
| 6,673,444 B2 * | 1/2004 | Yuuki et al. ................ 428/364 |
| 6,692,671 B2 * | 2/2004 | Fujimoto et al. ........... 264/130 |
| 6,740,400 B2 * | 5/2004 | Kato et al. .................. 428/364 |
| 6,916,535 B2 * | 7/2005 | Okajima et al. ............ 428/402 |
| 2006/0128905 A1 * | 6/2006 | Yokoyama et al. ......... 525/437 |

* cited by examiner

US 7,198,846 B2

POLYTRIMETHYLENE TEREPHTHALATE RESIN

CROSS REFERENCE TO RELATED APPLICATIONS

This application is based on and hereby claims priority to Japanese Application No. 2002-172735 filed on Jun. 13, 2002 and PCT Application No. PCT/JP03/07567 filed on Jun. 13, 2003, the contents of which are hereby incorporated by reference.

BACKGROUND OF THE INVENTION

1. Field of the Invention

The present invention relates to a polytrimethylene terephthalate resin. More particularly, the present invention is concerned with a polytrimethylene terephthalate resin comprised mainly of trimethylene terephthalate recurring units, which has the following characteristics: an intrinsic viscosity of from 0.8 to 4.0 dl/g; a molecular weight distribution (Mw/Mn) of from 2.0 to 2.7; a psychometric lightness L-value (L-1) of from 70 to 100 and a psychometric chroma b*-value (b*-1) of from −5 to 25; and a psychometric lightness L-value (L-2) of from 70 to 100 and a psychometric chroma b*-value (b*-2) of from −5 to 25 as measured after heating the polytrimethylene terephthalate resin at 180° C. for 24 hours in air. By using the polytrimethylene terephthalate resin of the present invention, a shaped article having high strength and excellent color can be stably produced on a commercial scale. Further, the present invention is also concerned with a method for stably producing the polytrimethylene terephthalate resin with high productivity on a commercial scale.

2. Prior Art

A polytrimethylene terephthalate resin (hereinafter, referred to as "PTT") not only has characteristics similar to those of a nylon (e.g., soft feeling due to the low elasticity of the resin, excellent elastic recovery and good dyeability), but also has characteristics similar to those of a polyethylene terephthalate (hereinafter, referred to as "PET") (e.g., wash and wear property, dimensional stability and discoloration resistance). Therefore, a PTT has been attracting attention as a raw material which can be used for producing carpets, clothes, shaped articles and the like.

For further expanding the application fields of a PTT, it has been desired to improve the strength and color of the fibers and shaped articles of a PTT.

For improving the strength of the fibers and shaped articles of a polymer, it is necessary to increase the polymerization degree of the polymer, and to narrow the molecular weight distribution of the polymer so as to reduce the amount of low molecular weight components in the polymer. Further, for improving the color of the fibers and shaped articles of a polymer, it is necessary not only to improve the whiteness of the polymer, but also to improve the heat resistance of the polymer so as to prevent the discoloration of the polymer, which is caused by the thermal history experienced by the polymer during the drying, melting and the like.

As a polymerization method for producing a PTT, a melt polymerization method is widely known. For example, Unexamined Japanese Patent Application Laid-Open Specification No. Hei 5-262862 (corresponding to U.S. Pat. No. 5,340,909), WO98/23662, WO01/14450 and WO01/14451 disclose a method in which a melt polymerization is performed using a polymerization vessel equipped with a stirrer. The above-mentioned polymerization vessel has advantages in that it exhibits excellent volume efficiency and has a simple structure. Such a polymerization vessel can be used on a small scale for efficiently performing a polymerization to produce a polymer having a high polymerization degree. However, when the above-mentioned polymerization vessel is used for performing a polymerization on a commercial scale, the depth of the liquid reaction mixture in the polymerization vessel inevitably becomes deep, leading to a marked occurrence of heat decomposition of the polymer. Thus, a polymer having high polymerization degree cannot be produced on a commercial scale.

Various techniques have been proposed for producing a PTT having a high polymerization degree by melt polymerization. Examples of such techniques include a technique in which a lower alcohol diester of terephthalic acid and trimethylene glycol are subjected to a transesterification reaction and a polycondensation reaction in the presence of a titanium compound, wherein the molar ratio of the lower alcohol diester of terephthalic acid to trimethylene glycol is in the range of from 1/1.2 to 1/1.8 (Unexamined Japanese Patent Application Laid-Open Specification No. Sho 51-140992); a technique in which an organometal catalyst is used as a polycondensation catalyst, and an organic sulfonic acid or an aliphatic carboxylic acid is used as a catalyst auxiliary (U.S. Pat. No. 4,611,049); a technique in which a tin catalyst is used as a polycondensation catalyst (Unexamined Japanese Patent Application Laid-Open Specification No. Hei 5-262862 (corresponding to U.S. Pat. No. 5,340,909)); a technique in which a specific titanium catalyst is used as a polycondensation catalyst (Unexamined Japanese Patent Application Laid-Open Specification Nos. 2000-159875 and 2000-159876); a technique in which an antimony compound is used as a polycondensation catalyst (Chemical Fiber International Vol. 46, pp 263–264, 1996); a technique in which heat decomposition of a PTT is suppressed by using a hindered phenol-type stabilizer having a specific structure (Unexamined Japanese Patent Application Laid-Open Specification No. Sho 51-142097); and a technique in which the by-production of acrolein (formed by heating of a prepolymer and a polymer in air during the polymerization) is suppressed by blocking the terminals of the prepolymer and the polymer with a phosphorus-containing stabilizer and a hindered phenol-type stabilizer (WO98/23662 and WO99/11709). However, the above-mentioned techniques are disadvantageous in that the molecular weight of the obtained PPT is not satisfactorily high, in that a lowering of the molecular weight of the PTT occurs during the molding thereof, and/or in that a discoloration of the PTT occurs. Thus, by the above-mentioned techniques, a PTT having satisfactory properties cannot be obtained.

Further, a method is proposed in which, for the purpose of obtaining a high molecular weight PTT which exhibits excellent heat stability during the spinning of the PTT, a solid-phase polymerization of a PTT prepolymer having a relatively low molecular weight is performed, in which the PTT prepolymer has not suffered heat decomposition and has excellent color (Unexamined Japanese Patent Application Laid-Open Specification No. Hei 8-311177, Japanese Patent Application prior-to-examination Publication (Tokuhyo) No. 2000-502392 and Korean Patent No. 1998-061618). However, the solid-phase polymerization proceeds while releasing trimethylene glycol (hereinafter, referred to as "TMG") from the surface of pellets of the prepolymer during the polymerization reaction. Therefore, the polymerization degree varies depending on the size and shape of the pellets, and also varies depending on the position in the pellets. Therefore, the PTT obtained by this method is markedly non-uniform with respect to the polymerization degree. Further, in the solid-phase polymerization, the pellets of the solid prepolymer get rubbed with one another over a long period of time, thereby generating a polymer powder which becomes a loss. Furthermore, in the above-mentioned method, the solid-phase polymerization should be conducted after the production of the prepolymer by the melt polymerization and the like, and thus, the entire process for producing a PTT becomes complicated and costly. Still further, the presence of the polymer powder in the spinning process causes breakage or fuzzing of polymer fibers. For removing the polymer powder, an addition step therefor becomes necessary.

As a method for producing a PTT having a high polymerization degree only by melt polymerization, a technique has been proposed in which the polymerization is performed using a disc ring reactor or a cage type reactor (WO00/64962) or a disc and donut conductor (U.S. Pat. No. 5,599,900) to withdraw the TMG efficiently from the reaction system. However, each of the above-mentioned apparatuses is a horizontal agitation-type polymerizer which is equipped with a rotary driving part. Therefore, in the above-mentioned method, when a polymerization is performed under a high vacuum for obtaining a polymer having a high polymerization degree, it is impossible to seal the driving part completely. Thus, it is impossible to prevent the intrusion of a trace amount of oxygen into the polymer, and hence, a, discoloration of the polymer inevitably occurs. Especially, in the case of a PTT, such discoloration markedly occurs. When the driving part is sealed with a sealing liquid, it is likely that the sealing liquid gets mixed with the polymer, thereby lowering the quality of the resultant PTT. Further, even when the driving part of the apparatus is tightly sealed at the start of the operation thereof, the tightness of the sealing is lowered during the operation conducted for a long period of time. Thus, the above-mentioned method also has a serious problem with respect to the maintenance of the apparatuses.

On the other hand, a method for producing a resin (other than PTT) is known in which the polymerization apparatus used therein does not have a rotary driving part, and a polymerization is performed by allowing a prepolymer to fall from a perforated plate (free-fall polymerization method).

For example, a method is disclosed in which a polyester prepolymer is allowed to fall in the form of fibers in vacuo in an attempt to obtain a polyester having a desired molecular weight (U.S. Pat. No. 3,110,547). In this method, a polymerization reaction is performed in a one pass mode without recycling the polymer, because the recycling of a polymer which has already been allowed to fall in the form of fibers causes the lowering of the quality of the final polyester. However, the above-mentioned method has the following disadvantages. The polymer in the form of fibers are easily broken during the polymerization reaction, thereby causing a disadvantageously large variation in quality of the final condensation polymer products. In addition, a low molecular weight condensation polymer is scattered from the polymer fibers during the polymerization reaction to stain the lower surface of the perforated plate. Due to such staining of the lower surface of the perforated plate, it becomes difficult to cause the polymer to fall in the form of fibers, so that the polymer fibers contact with one another to cause breakage of the polymer fibers or the polymer fibers are combined together to form a thick fiber in which the reaction does not proceed efficiently.

In order to solve these problems, various methods have been proposed. Examples of such methods include a method in which a polyester or a polyamide is produced by allowing a prepolymer to fall along and in contact with the surface of a perforated guide or a wire guide, which is vertically arranged in a reaction vessel, so that the polymerization of the prepolymer is effected during the fall thereof (Examined Japanese Patent Application Publication No. Sho 48-8355 and Unexamined Japanese Patent Application Laid-Open Specification No. Sho 53-17569); a method for continuously condensation-polymerizing bis-(β-hydroxyalkyl) terephthalate (which is an initial-stage condensation product of polyethylene terephthalate (PET)), in which bis-(β-hydroxyalkyl) terephthalate is allowed to fall along and in contact with wire guides in an atmosphere of inert gas, wherein the wire guides are hung vertically from the holes of a perforated plate, so that the polymerization of bis-(β-hydroxyalkyl) terephthalate is effected during the fall thereof (Examined Japanese Patent Application Publication No. Hei 4-58806); and a method for producing a melt-polycondensation polymer, such as a polyester, a polyamide and a polycarbonate, in which a melt-polycondensation prepolymer is caused to absorb an inert gas, and then, polymerized under reduced pressure (WO99/65970 which also discloses an apparatus used in the method).

However, each of the above patent documents only describes a method for producing a polyester, such as a PET, or nylon, and has no proposal or suggestion about the production of a PTT. As a result of the studies of the present inventors, it has been found that, when any of the above-mentioned methods are simply applied to the production of a PTT (that is, when the production of a PTT is conducted by the above-mentioned methods, using raw materials and conditions which are conventionally used in the production of a PTT), a foaming of a polymer vigorously occurs, thereby staining the lower surface of the perforated plate or the inner wall of the reaction vessel having the guides provided therein. A PTT is susceptible to heat decomposition, as compared to a PET. Therefore, the stain caused by the above-mentioned vigorous foaming of the polymer is easily decomposed. When the resultant decomposition products get mixed with the polymer, disadvantages are caused in that the quality of the polymer is lowered, in that the desired polymerization degree cannot be obtained, and in that the obtained PTT suffers discoloration. Further, the simple application of the above-mentioned methods to the production of PTT is accompanied by problems in that it is difficult to achieve a satisfactorily high polymerization degree, and in that the final PTT contains low molecular weight polymers, which result in a broad molecular weight distribution of the final polymer and are likely to lower the mechanical strength of an ultimate shaped article.

As mentioned above, the conventional methods for producing a PTT have the following problems:

(1) It is difficult to produce a PTT having a high polymerization degree only by melt polymerization (i.e., without solid-phase polymerization) on a commercial scale. When the production of a PTT is conducted by solid-phase polymerization, disadvantages are caused in that the molecular weight distribution of the obtained PTT becomes too broad, and in that the production process becomes complicated and costly (due to the loss caused by the formation of polymer powder).

(2) When it is attempted to produce a PTT having high polymerization degree by using a specific catalyst or stabilizer, the obtained polymer is likely to suffer heat decomposition and discoloration.

With respect to the free-fall method (in which a polymerization is performed by allowing a prepolymer to fall freely in the form of fibers from a perforated plate) and the guide-wetting fall method (in which a polymerization is performed by allowing a prepolymer to fall along and in contact with a guide), it is known that these methods can be used for producing polyamide and polyesters (such as a PET) other than a PTT. However, the application of the above-mentioned methods to the production of a PTT is not known, and a PTT having satisfactory properties cannot be obtained by a simple application of these methods to the production of a PTT which is different from the above-mentioned polyamides and other polyesters with respect to the melt viscosity, and resistance to heat decomposition, and volatilities of by-products.

For these reasons, there has been a demand for the development of a method which can be used for producing an excellent PTT having a high polymerization degree on a commercial scale, which PTT can be used for stably producing a shaped article having excellent strength and color.

SUMMARY OF THE INVENTION

In this situation, the present inventors have made extensive and intensive studies with a view toward solving the above-mentioned problems accompanying the prior art techniques. As a result, it has unexpectedly been found that, by polymerizing a molten form of a specific trimethylene terephthalate prepolymer by the so-called "guide-wetting fall process" at a temperature of from the crystalline melting point of the prepolymer to 290° C., it becomes possible to produce a specific excellent polytrimethylene terephthalate resin which can be used for stably producing a shaped article exhibiting excellent strength and color. The above-mentioned specific polytrimethylene terephthalate resin is composed mainly of recurring units of trimethylene terephthalate, and has the following characteristics: an intrinsic viscosity [η] of from 0.8 to 4.0 dl/g; a molecular weight distribution (Mw/Mn) of from 2.0 to 2.7; a psychometric lightness L-value (L-1) of from 70 to 100 and a psychometric chroma b*-value (b*-1) of from −5 to 25; and a psychometric lightness L-value (L-2) of from 70 to 100 and a psychometric chroma b*-value (b*-2) of from −5 to 25 as measured after heating the polytrimethylene terephthalate resin at 180° C. for 24 hours in air. The present invention has been completed, based on these novel findings.

Accordingly, it is an object of the present invention to provide a polytrimethylene terephthalate resin which can be used for stably producing a shaped article having excellent strength and color on a commercial scale.

The foregoing and other objects, features and advantages of the present invention will be apparent from the following description and appended claims taken in connection with the accompanying drawings.

DESCRIPTION OF REFERENCE CHARACTERS AND NUMERALS

Figure 1:
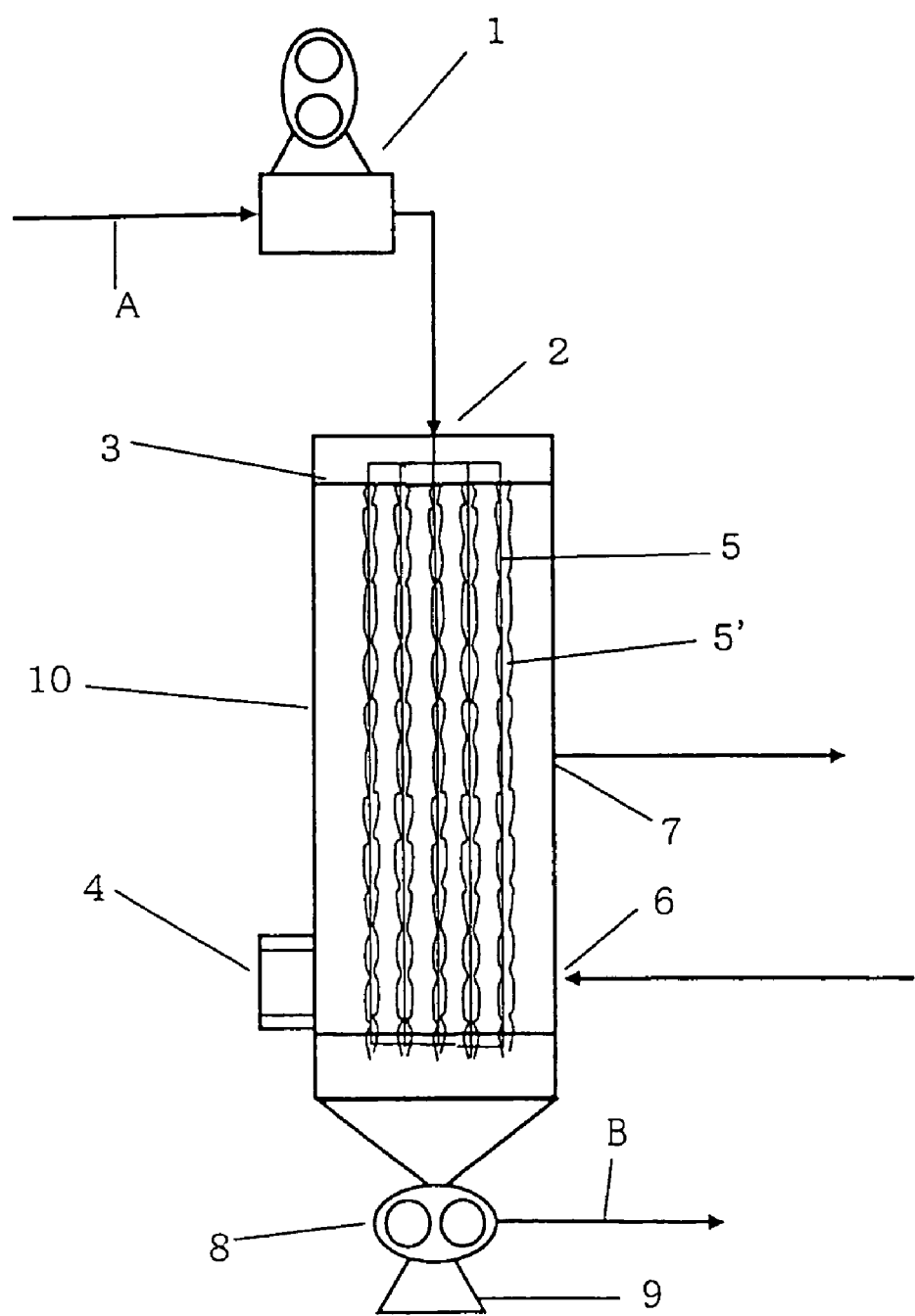
FIG. 1 shows an explanatory diagrammatic view of an example of a reaction vessel which can be used in the present invention.

A: Polytrimethylene terephthalate prepolymer
B: Polytrimethylene terephthalate resin
C: Mixture of raw materials (including a starting monomer, a reactant monomer, a catalyst, an additive and the like)
D: Exhaust gas
E: Inert gas
1, 14, 18, 28, 32, N2 and N7: Transferring pump
2: Inlet for prepolymer A
3, N4: Perforated plate
4: Observing window
5, N5: Guide
5': Polymer falling along and in contact with the guide
6: Inlet for gas
7, 13, 17, 21, 24, 27 and 31: Vent
8: Withdrawal pump for polymer 5'
9: Outlet for polymer 5'
10: Polymerizer
11: Esterification reaction vessel
12, 16, 20, 23, 26 and 30: Agitation element
15: First vertical agitation type polymerizer
19: Second vertical agitation type polymerizer
22: Horizontal agitation type polymerizer
25: First transesterification reaction vessel
29: Second transesterification reaction vessel
N1: Inert gas absorption device
N3: Inlet for raw materials
N6: Inlet for inert gas

DETAILED DESCRIPTION OF THE INVENTION

In one aspect of the present invention, there is provided a polytrimethylene terephthalate resin comprising:
90 to 100 mole % of trimethylene terephthalate recurring units, and
0 to 10 mole % of at least one monomer unit selected from the group consisting of monomer units obtained from comonomers which are other than the monomers used for forming the trimethylene terephthalate recurring units and which are copolymerizable with at least one of the monomers used for forming the trimethylene terephthalate recurring units, the polytrimethylene terephthalate resin having the following characteristics (A) to (D):

(A) an intrinsic viscosity [η] of from 0.8 to 4.0 dl/g;

(B) a molecular weight distribution of from 2.0 to 2.7 in terms of the Mw/Mn ratio, wherein Mw represents the weight average molecular weight of the polytrimethylene terephthalate resin and Mn represents the number average molecular weight of the polytrimethylene terephthalate resin;

(C) a psychometric lightness L-value (L-1) of from 70 to 100 and a psychometric chroma b*-value (b*-1) of from −5 to 25; and (D) a psychometric lightness L-value (L-2) of from 70 to 100 and a psychometric chroma b*-value (b*-2) of from −5 to 25 as measured after heating the polytrimethylene terephthalate resin at 180° C. for 24 hours in air.

For easy understanding of the present invention, the essential features and various preferred embodiments of the present invention are enumerated below.

1. A polytrimethylene terephthalate resin comprising:
90 to 100 mole % of trimethylene terephthalate recurring units, and 0 to 10 mole % of at least one monomer unit selected from the group consisting of monomer units obtained from comonomers which are other than the monomers used for forming the trimethylene terephthalate recurring units and which are copolymerizable with at least one of the monomers used for forming the trimethylene terephthalate recurring units, the polytrimethylene terephthalate resin having the following characteristics (A) to (D):

(A) an intrinsic viscosity [η] of from 0.8 to 4.0 dl/g;

(B) a molecular weight distribution of from 2.0 to 2.7 in terms of the Mw/Mn ratio, wherein Mw represents the weight average molecular weight of the polytrimethylene terephthalate resin and Mn represents the number average molecular weight of the polytrimethylene terephthalate resin;

(C) a psychometric lightness L-value (L-1) of from 70 to 100 and a psychometric chroma b*-value (b*-1) of from −5 to 25; and (D) a psychometric lightness L-value (L-2) of from 70 to 100 and a psychometric chroma b*-value (b*-2) of from −5 to 25 as measured after heating the polytrimethylene terephthalate resin at 180° C. for 24 hours in air.

2. The polytrimethylene terephthalate resin according to item 1 above, wherein the polytrimethylene terephthalate resin has an intrinsic viscosity [η] of from 1.25 to 2.5 dl/g.

3. The polytrimethylene terephthalate resin according to item 1 or 2 above, which has a terminal carboxyl group content of from 0 to 20 meq/kg.

4. The polytrimethylene terephthalate resin according to any one of items 1 to 3 above, which has a molecular weight distribution of from 2.0 to 2.6.

5. The polytrimethylene terephthalate resin of any one of items 1 to 4 above, which is in the form of pellets.

6. The polytrimethylene terephthalate resin according to item 5 above, wherein the pellets have an average weight of from 1 to 1000 mg per pellet, and wherein the pellets contains a powder of the polytrimethylene terephthalate resin in an amount of 0 to 0.5% by weight, based on the total weight of the pellets, which powder passes through a 30-mesh filter and does not pass through a 300-mesh filter.

7. The polytrimethylene terephthalate resin according to item 5 or 6 above, wherein the pellets have a crystallinity ($X_c$) of 40% or less, wherein the crystallinity is defined by the following formula:

$$X_c(\%) = \{\rho_c \times (\rho_s - \rho_a)\} / \{\rho_s \times (\rho_c - \rho_a)\} \times 100$$

wherein $\rho_a$ is 1.300 g/cm³ which is an amorphous density of trimethylene terephthalate homopolymer, $\rho_c$ is 1.431 g/cm³ which is a crystal density of trimethylene terephthalate homopolymer, and $\rho_s$ represents a density (g/cm³) of the pellets.

8. A method for producing a polytrimethylene terephthalate resin, which comprises:

(1) providing a molten form of a trimethylene terephthalate prepolymer comprising:

90 to 100 mole % of trimethylene terephthalate recurring units, and 0 to 10 mole % of at least one monomer unit selected from the group consisting of monomer units obtained from comonomers which are other than the monomers used for forming the trimethylene terephthalate recurring units and which are copolymerizable with at least one of the monomers used for forming the trimethylene terephthalate recurring units, the trimethylene terephthalate prepolymer having an intrinsic viscosity [η] of from 0.2 to 2 dl/g, and (2) polymerizing the molten form of a trimethylene terephthalate prepolymer at a temperature which is equal to or higher than the crystalline melting point of the prepolymer and is not higher than 290° C. under reduced pressure by the guide-wetting fall process in which the prepolymer is allowed to fall along and in contact with the surface of a guide so that polymerization of the prepolymer is effected during the fall thereof.

9. The method according to item 8 above, wherein the molten prepolymer is continuously fed to a polymerization reaction zone for effecting the polymerization of the prepolymer in the step (2) and the resultant polytrimethylene terephthalate resin produced in the step (2) is continuously withdrawn from the polymerization zone, so that the step (2) for prepolymer polymerization is continuously performed.

10. The method according to item 8 or 9 above, wherein the guide has at least one portion selected from the group consisting of a concave portion, a convex portion and a perforated portion.

11. The method according to any one of items 8 to 10 above, wherein the prepolymer falling along and in contact with the surface of the guide is in a foaming state.

12. The method according to any one of items 8 to 11 above, wherein the polymerization in the step (2) is performed, while introducing inert gas to the polymerization reaction zone.

13. The method according to item 12 above, wherein the amount of the inert gas introduced to the polymerization reaction zone is in the range of from 0.05 to 100 mg per gram of the polytrimethylene terephthalate resin withdrawn from the polymerization reaction zone.

14. The method according to item 12 or 13 above, wherein at least a part of the inert gas is introduced to the polymerization reaction zone, independently from the feeding of the trimethylene terephthalate prepolymer to the polymerization reaction zone.

15. The method according to any one of items 12 to 14 above, wherein at least a part of the inert gas is introduced to the polymerization reaction zone in such a form as absorbed or contained in the trimethylene terephthalate prepolymer.

16. The method according to any one of items 8 to 15 above, wherein the prepolymer has an intrinsic viscosity [η] of from 0.5 to 2.0 dl/g and a terminal carboxyl group ratio of 50% or less in terms of the molar ratio (%) of the terminal carboxyl groups of the prepolymer to all terminal groups of the prepolymer.

17. The method according to any one of items 8 to 16 above, wherein the prepolymer is produced by at least one polymerization method selected from the following methods (a) to (d):

(a) a polymerization method using a vertical agitation type polymerizer;

(b) a polymerization method using a horizontal agitation type polymerizer;

(c) a polymerization method using a free-fall polymerizer having a perforated plate; and (d) a polymerization method using a thin film type polymerizer.

18. The method according to item 17 above, wherein the prepolymer is produced by the method (b).

19. A polytrimethylene terephthalate resin produced by the method of any one of items 8 to 18 above.

Hereinbelow, the present invention is described in detail.

The polytrimethylene terephthalate resin of the present invention comprises:

90 to 100 mole % of trimethylene terephthalate recurring units, and 0 to 10 mole % of at least one monomer unit selected from the group consisting of monomer units obtained from comonomers which are other than the monomers used for forming the trimethylene terephthalate recurring units and which are copolymerizable with at least one of the monomers used for forming the trimethylene terephthalate recurring units.

The trimethylene terephthalate recurring units are formed by reacting a terephthalic acid material with a trimethylene glycol material. Examples of terephthalic acid materials include terephthalic acid, and diesters of terephthalic acid, such as dimethyl terephthalate. Examples of trimethylene glycol materials include 1,3-propanediol, 1,2-propanediol, 1,1-propanediol, 2,2-propanediol, and a mixture thereof. From the viewpoint of stability, 1,3-propanediol is especially preferred as a trimethylene glycol material.

Examples of the above-mentioned comonomers include ester-forming monomers, such as 5-sulfoisophthalic acid sodium salt, 5-sulfoisophthalic acid potassium salt, 4-sulfo-2,6-naphthalenedicarboxylic acid sodium salt, 3,5-dicarboxylic acid benzenesulfonic acid tetramethylphosphonium salt, 3,5-dicarboxylic acid benzenesulfonic acid tetrabutylphosphonium salt, 3,5-dicarboxylic acid benzenesulfonic acid tributylmethylphosphonium salt, 3,6-dicarboxylic acid naphthalene-4-sulfonic acid tetrabutylphosphonium salt, 3,6-dicarboxylic acid naphthalene-4-sufonic acid tetramethylphosphonium salt, 3,5-dicarboxylic acid benzenesulfonic acid ammonium salt, 3,2-butanediol, 1,3-butanediol, 1,4-butanediol, neopentyl glycol, 1,5-pentamethyleneglycol, 1,6-hxamethylene glycol, heptamethylene glycol, octamethylene glycol, decamethylene glycol, dodecamethylene glycol, 1,4-cyclohexanediol, 1,3-cyclohexanediol, 1,2-cyclohexanediol, 1,4-cyclohexanedimethanol, 1,3-cyclohexanedimethanol, 1,2-cyclohexanedimethanol, oxalic acid, malonic acid, succinic acid, gultaric acid, adipic acid, heptanedioic acid, octanedioic acid, sebacic acid, dodecanedioic acid, 2-methylgultaric acid, 2-methyladipic acid, fumaric acid, maleic acid, itaconic acid, 1,4-cyclohexanedicarboxylic acid, 1,3-cyclohexanedicarboxylic acid and 1,2-cyclohexanedicarboxylic acid.

The polytrimethylene terephthalate resin of the present invention may further comprise: cyclic or chain oligomers other than polytrimethylene terephthalate resin; monomers, such as dimethyl terephthalate (hereinafter, referred to as "DMT"), terephthalic acid (hereinafter, referred to as "TPA") and trimethylene glycol (hereinafter, referred to as "TMG"); and/or any of various additives, such as a delustering agent, a thermal stabilizer and a flame retardant.

For obtaining a fiber or a shaped article, which has excellent strength and color, and which is aimed at in the present invention, it is necessary not only to improve the polymerization degree of the polytrimethylene terephthalate resin while narrowing the distribution of polymerization degree, but also to improve the whiteness of the resin while improving the resistance of the resin against the discoloration at high temperatures.

As a yardstick of the polymerization degree, the intrinsic viscosity [η] can be used. For obtaining the above-mentioned excellent fiber or shaped article, which has excellent strength, it is necessary that the resin (used for producing the fiber or shaped article) have an intrinsic viscosity of 0.8 dl/g or more. On the other hand, from the viewpoint of improving the moldability of the resin and the ease in measuring the amount of the resin in a gear pump, the intrinsic viscosity should not be too high. For this reason, it is necessary that the intrinsic viscosity [η] be 4.0 dl/g or less. The intrinsic viscosity [η] is preferably in the range of from 1.05 to 3.0 dl/g, more preferably from 1.25 to 2.5 dl/g, still more preferably from 1.3 to 2.0 dl/g.

Further, for improving the strength of the above-mentioned fiber or shaped article, not only should the average polymerization degree be high, but also the amount of a low molecular weight polymer should be low, namely, the molecular weight distribution should be narrow. In the present invention, the molecular weight distribution is expressed in terms of a value (Mw/Mn) which is calculated by dividing the weight average molecular weight (Mw) by the number average molecular weight (Mn), wherein each of Mw and Mn is measured by gel permeation chromatography. In the present invention, it is necessary that the Mw/Mn value be 2.7 or less. The Mw/Mn value is preferably 2.6 or less, more preferably 2.5 or less, still more preferably 2.4 or less. In general, the lower limit of the molecular weight distribution of a condensation polymer is 2.

With respect to the color of the polytrimethylene terephthalate resin, for suppressing the darkening of the ultimate shaped article and for enabling the resin to exhibit a desired color by the use of a dye or a pigment, it is necessary that the polytrimethylene terephthalate resin have a psychometric lightness L-value (L-1) of 70 or more and a psychometric chroma b*-value (b*-1) of −5 or more. From the viewpoint of suppressing the discoloration of the resin by heat decomposition, it is necessary that the polytrimethylene terephthalate resin have a psychometric chroma b*-value of 25 or less. There is no particular limitation with respect to the upper limitation of the (L-1) value, but in general, it is 100. The (L-1) value is preferably 75 or more, more preferably 80 or more. The (b*-1) value is preferably from −3 to 15, more preferably from −2 to 10.

Further, from the studies of the present inventors, it has been found that, for improving the whiteness of the ultimate shaped article, a polytrimethylene terephthalate resin used for producing a shaped article should exhibit not only excellent whiteness, but also excellent resistance to discoloration during the heating of the resin (e.g., during the high temperature drying, melt molding or the like of the resin). The reason for this is not clear, but it is presumed that the discoloration of the resin is caused by not only the thermal decomposition of the resin per se, but also certain substances or functional groups which are inevitably contained in the polytrimethylene terephthalate resin. It is considered that the above-mentioned substances or functional groups are formed by heat decomposition of a prepolymer (used in the production of the polytrimethylene terephthalate resin) and/or the polytrimethylene terephthalate resin. However, especially when the below-mentioned polymerization method proposed by the present inventors is employed, it is possible to obtain a polytrimethylene terephthalate resin which has excellent resistance to the discoloration during the heating. The reason for this is considered as follows. The proposed method is advantageous not only in that the leakage of oxygen into the polymerization reaction system can be suppressed, thereby preventing the formation of the above-mentioned substances and functional groups, but also in that the surface area of the prepolymer being polymerized in the polymerizer employed in this method is extremely large as compared to the case of polymerizers which are conventionally employed for the production of a polytrimethylene terephthalate resin, and the surface of the prepolymer is efficiently renewed, so that the above-mentioned substances or functional groups, if any, can be easily withdrawn from the reaction system.

As a yardstick of the susceptibility to discoloration by heat, the color of a polytrimethylene terephthalate resin after heating at 180° C. for 24 hours in air can be used. In the present invention, the polytrimethylene terephthalate resin heated under the above-mentioned conditions needs to have a psychometric lightness L-value (L-2) of 70 or more, and a psychometric chroma b*-value (b*-2) of from −5 to 25. The psychometric lightness L-value (L-2) is preferably 75 or more, more preferably 80 or more. The psychometric chroma b*-value (b*-2) is preferably from −4 to 21, more preferably from −3 to 18, still more preferably from −2 to 16.

In the present invention, for preventing the hydrolysis of the polytrimethylene terephthalate resin even when the shaping of the resin which has not been fully dried is performed, and for improving the weatherability of a shaped article of the polytrimethylene terephthalate resin, it is preferred that the polytrimethylene terephthalate resin of the present invention has a terminal carboxyl group content of not more than 30 meq/kg (based on the weight of the polytrimethylene terephthalate resin). The terminal carboxyl group content is preferably not more than 20 meq/kg, more preferably not more than 15 meq/kg, still more preferably not more than 10 meq/kg. It is preferred that the terminal carboxyl group content is as small as possible.

The polytrimethylene terephthalate resin of the present invention can be used, for example, for producing an extrusion-molded article, such as a film or a sheet. In the production of such an extrusion-molded article, it is desired that the polytrimethylene terephthalate resin simultaneously satisfies all of such requirements as a very high molecular weight, a very narrow molecular weight distribution and a very low terminal carboxyl group content. Therefore, it is preferred that the polytrimethylene terephthalate resin for use in the production of an extrusion-molded article has an intrinsic viscosity [η] of from 1.25 to 2.5 dl/g, an Mw/Mn ratio of 2.6 or less and a terminal carboxyl group content of 20 meq/kg or less; it is more preferred that the resin has an intrinsic viscosity [η] of from 1.30 to 2.0 dl/g, an Mw/Mn ratio of 2.5 or less and a terminal carboxyl group content of 15 meq/kg or less; and it is still more preferred that the resin has an intrinsic viscosity [η] of from 1.30 to 2.0 dl/g, an Mw/Mn ratio of 2.4 or less and a terminal carboxyl group content of 10 meq/kg or less. When the production of the polytrimethylene terephthalate resin is conducted by the below-mentioned polymerization method proposed by the present inventors, the polymerization rate is high and the surface area of the prepolymer being polymerized is large. Therefore, not only can the polymerization degree be improved, but also the terminal carboxyl group content can be lowered to a level which has never been achieved by the conventional melt polymerization. Further, in this method, the polymerization degree can be improved while maintaining a high piston flowability (the "high piston flowability" means a property that the flowing resin in the polymerizer has no local variation of the flow rate, i.e., the flowing resin as a whole has a uniform flow rate). Thus, by the proposed method, it is possible to obtain a polytrimethylene terephthalate resin having a narrow molecular weight distribution, i.e., a resin which does not contain polymers having largely different molecular weights. When a polytrimethylene terephthalate resin is produced by solid-phase polymerization, the resin produced exhibits a high polymerization degree. However, in the solid-phase polymerization, the polymerization degree varies depending on the reaction site in the pellets (i.e., whether the reaction site is at an inner portion or outer portion of the pellets), and also varies depending on the size and shape of the pellets, so that it is very difficult to obtain a polymer having a narrow molecular weight distribution. By the proposed polymerization method, it has, for the first time, become possible to produce a polytrimethylene terephthalate resin which can be suitably used for the commercial scale production of the above-mentioned extrusion-molded article.

The polytrimethylene terephthalate resin of the present invention, which is in a molten form obtained immediately after the production thereof, can be spun or shaped. Alternatively, the resin can be formed into pellets, and then re-melted at the time of spinning or shaping of the resin.

When the resin is used in the form of pellets, it is desired that the amount of loss is small, and that the pellets can be extruded uniformly by means of an extruder. Therefore, it is preferred that each pellet has an appropriate size, and that the amount of polymer powder adhering to the surface of the pellets is small.

In the present invention, it is preferred that the average weight of pellets is from 1 to 1,000 mg per pellet. The pellets having such an average weight is advantageous in that uniform extrusion of the pellets by means of a extrusion molding machine becomes easy, that the pellets can be handled with ease at the time of transportation, drying and spinning thereof, and that the drying rate of the pellets becomes fast. The average weight of the pellets is more preferably from 5 to 500 mg per pellet, still more preferably from 10 to 200 mg per pellet. With respect to the shape of the pellet, there is no particular limitation, and the shape of the pellet may be any of a sphere, a rectangle, a cylinder and a cone. However, from the viewpoint of ease in handling of the pellets, it is preferred that the length of the largest portion of each pellet is 15 mm or less, more advantageously 10 mm or less, still more advantageously 5 mm or less.

With respect to the polymer powder adhering to the surface of the pellets, it is preferred that the amount of the polymer powder is in the range of from 0 to 0.5% by weight, based on the total weight of the pellets, which powder passes through a 30-mesh filter and does not pass through a 300-mesh filter. When the amount of the polymer powder is 0.5% by weight or less, not only is the loss decreased, but also it becomes possible to prevent the clogging of a pneumatic line (i.e., pipe line in which pellets are transferred by gas) or a filter of an air-exhaust ventilator attached to a dryer, and to suppress the pressure variation in an extruder during the spinning, molding or compounding, so that ultimate products having a uniform quality can be easily obtained. It is preferred that the amount of the polymer powder is as small as possible. From a practical point of view, the amount of the polymer powder is preferably in the range of from 0 to 0.2% by weight, more preferably from 0 to 0.1% by weight, still more preferably from 0 to 0.05% by weight, based on the total weight of the pellets.

Further, it is preferred that the pellets have a crystallinity ($X_c$) of 0 to 40%, wherein the crystallinity is defined by the following formula:

$$X_c(\%) = \{\rho_c \times (\rho_s - \rho_a)\} / \{\rho_s \times (\rho_c - \rho_a)\} \times 100$$

wherein $\rho_a$ is 1.300 g/cm³ which is an amorphous density of trimethylene terephthalate homopolymer, $\rho_c$ is 1.431 g/cm³ which is a crystal density of trimethylene terephthalate homopolymer, and $\rho_s$ represents a density (g/cm³) of the pellets.

The above-mentioned crystal density of trimethylene terephthalate homopolymer (1.431 g/cm³) is a theoretical value which is calculated from the number of crystal lattices of trimethylene terephthalate homopolymer. The above crystal density value (1.431 g/cm³) is described in "Poritori-mechirenterefutareto no Kesshoudanseiritsu (Crystal elasticity of polytrimethylene terephthalate)" ("Zairyou (Material)", written by Katsuhiko Nakamae, Vol. 35, No. 396, p. 1067, 2000). Further, the amorphous density of trimethylene terephthalate homopolymer (1.300 g/cm³) is obtained by measuring the density of a sample amorphous polymer obtained by quenching a trimethylene terephthalate homopolymer in a molten form. (With respect to the sample polymer, it can be confirmed that the sample polymer is amorphous, when no crystal peak is observed in the analysis of the sample polymer by X-ray diffractometry.)

When the pellets have the above-mentioned crystallinity, it becomes possible to prevent a problem which is unique to a PTT and is unlikely to arise in the case of other polyesters, such as a PET and a PBT (polybutylene terephthalate), i.e., a problem that pellets become brittle and generate a large amount of polymer powder during the transportation of the pellets by means of a pneumatic conveyor or a feeder. It is preferred that the crystallinity is from 0 to 35%, more advantageously from 0 to 30%.

In the present invention, the crystallinity of a pellet means an average value of crystallinity values measured at different portions of the pellet. Specifically, for example, it is preferred that, when a surface portion of the pellet is cut away from a central portion of the pellet and crystallinities of these portions are measured, both of the surface portion and the central portion are in the above-mentioned crystallinity range. Further, it is preferred that the difference in crystallinity between the surface portion and the central portion is 40% or less, more advantageously 30% or less, still more advantageously 20% or less.

For obtaining pellets having the above-mentioned crystallinity, it is preferred that a polytrimethylene terephthalate in a molten form, which is obtained by polymerization, is extruded into a strand or a sheet, and, subsequently, the obtained strand or sheet is immersed in a coolant, such as water, to cool the strand or sheet, followed by cutting of the strand or sheet to obtain pellets. It is preferred that the temperature of the coolant is 20° C. or less, more advantageously 15° C. or less, still more advantageously 10° C. or less. From the viewpoint of economy and ease in handling of the pellets, it is preferred to use water as a coolant. Naturally, the temperature of water as a coolant is 0° C. or more. It is preferred that the cutting to obtain pellets is performed with respect to the strand or sheet solidified by cooling the extruded strand or sheet to 55° C. or lower within 120 seconds after the extrusion.

Hereinbelow, the method for producing the polytrimethylene terephthalate resin of the present invention is described in detail.

The method for producing the polytrimethylene terephthalate resin of the present invention comprises the following steps (1) and (2):

(1) providing a molten form of a trimethylene terephthalate prepolymer comprising:

90 to 100 mole % of trimethylene terephthalate recurring units, and 0 to 10 mole % of at least one monomer unit selected from the group consisting of monomer units obtained from comonomers which are other than the monomers used for forming the trimethylene terephthalate recurring units and which are copolymerizable with at least one of the monomers used for forming the trimethylene terephthalate recurring units, the trimethylene terephthalate prepolymer having an intrinsic viscosity [η] of from 0.2 to 2 dl/g, and (2) polymerizing the molten form of a trimethylene terephthalate prepolymer at a temperature which is equal to or higher than the crystalline melting point of the prepolymer and is not higher than 290° C. under reduced pressure by the guide-wetting fall process in which the prepolymer is allowed to fall along and in contact with the surface of a guide so that polymerization of the prepolymer is effected during the fall thereof.

As mentioned above, a polymerizer which does not have a rotary driving part has been proposed as a polymerizer for producing resins other than a polytrimethylene terephthalate. However, the melt-polycondensation reaction for producing a polytrimethylene terephthalate greatly differs from the melt-polycondensation reactions for producing other types of polyesters, such as a PET and a PBT, and for producing polyamides. Therefore, a practical production of a polytrimethylene terephthalate cannot be realized simply by employing the polymerizers which have been used for the production of the other types of polyesters and for the production of polyamides. The important differences between the polytrimethylene terephthalate, and polyamides and the other types of polyesters (such as a PET and a PBT) are explained below.

Firstly, both of the melt-polycondensation reaction for producing polyamides and the melt-polycondensation reaction for producing the other types of polyesters are equilibrium reactions. However, the equilibrium constants of the above two reactions greatly differ from each other. In general, the equilibrium constants of the melt-polycondensation reactions for producing polyamides are in the order of $10^2$, whereas the equilibrium constants of the melt-polycondensation reactions for producing the other types of polyesters is approximately 1. Thus, despite that both of the reactions for producing polyamides and the reactions for producing the other types of polyesters are polycondensation reactions, the equilibrium constants of the reactions for producing the other types of polyesters are extremely small as compared to those of the reaction for producing the polyamides. When an equilibrium constant of a certain reaction is large, the reaction proceeds even without efficiently withdrawing a by-product from the reaction system. Therefore, it is easy to increase the polymerization degrees of polyamides. With respect to the other types of polyesters (such as a PET and a PBT), although the equilibrium constants of the reactions for producing a PET and a PBT are small, the by-products can be easily withdrawn from the reaction systems, so that it is also easy to increase the polymerization degree of each of a PET and a PBT. The reason for this is as follows. In the case of a PET, the PET has a satisfactory heat stability, and hence, a polymerization reaction for producing the PET can be performed at a temperature (generally from 280 to 300° C.) which is much higher than the boiling point (198° C.) of ethylene glycol which is a by-product of the polymerization reaction. By performing the polymerization at such a high temperature, the vapor pressure of ethylene glycol can be increased and, hence, the ethylene glycol can be easily withdrawn from the reaction system. Also in the case of a PBT, 1,4-butanediol, which is a by-product of the polymerization reaction for producing a PBT, can be easily withdrawn from the reaction system. The reason for this has not yet been elucidated, but is considered as follows. In the polymerization reaction system for producing a PBT, 1,4-butanediol (which is a by-product having a high boiling point) is converted into low boiling point substances, such as tetrahydrofuran (formed by hydrolysis) and butadiene (formed by heat decomposition), which low boiling point substances can be easily withdrawn from the reaction system.

As in the case of the polymerization reactions for producing the other types of polyesters, the polymerization reaction for producing a polytrimethylene terephthalate has a low equilibrium constant, and hence, the by-produced trimethylene glycol (TMG) needs to be efficiently withdrawn from the reaction system so as to advance the polymerization reaction. The TMG has a boiling point as high as 214° C. On the other hand, the polytrimethylene terephthalate is susceptible to heat decomposition, so that the polymerization reaction for producing the polytrimethylene terephthalate needs to be performed at a low temperature. Therefore, it is difficult to withdraw the TMG from the reaction system. Further, when the polymerization degree of a polytrimethylene terephthalate becomes high, the following disadvantage is caused. The viscosity of the polytrimethylene terephthalate also becomes high and, hence, it becomes difficult to withdraw TMG from the reaction system. In such a case, a heat decomposition of the polytrimethylene terephthalate markedly occurs, so that the reaction rate is lowered, and then, the polymerization degree of the polytrimethylene terephthalate starts to be lowered. If the polymerization reaction is performed at a high temperature, the withdrawal of the TMG becomes easier; however, the heat decomposition of the polytrimethylene terephthalate markedly occurs, thereby leading to the above-mentioned disadvantage that, when the polymerization degree of a polytrimethylene terephthalate becomes high and the viscosity of the polytrimethylene terephthalate also becomes high, the reaction rate is lowered, and then, the polymerization degree of the polytrimethylene terephthalate starts to be lowered.

However, as a result of the studies of the present inventors, it has unexpectedly been found that, when a molten form of a polytrimethylene terephthalate prepolymer having an intrinsic viscosity within the above-mentioned specific range is polymerized by the above-mentioned guide-wetting fall process at an appropriate temperature under reduced pressure, a polytrimethylene terephthalate can be produced without causing the problems accompanying the conventional polymerization methods for producing the other types of polyesters, such as a PET, and for producing polyamides, i.e., methods in which a polymerization is performed by allowing a prepolymer to fall in the form of fibers or to fall along and in contact with a guide, such as a wire.

With respect to the guide-wetting fall process, reference can be made, for example, to U.S. Pat. Nos. 5,589,564, 5,840,826, 6,265,526 and 6,320,015.

The features of the method of the present invention are described below.

Firstly, for obtaining a polytrimethylene terephthalate resin having a high polymerization degree only by melt polymerization, it is required not only to suppress the heat decomposition of the PTT, but also to remove efficiently a TMG (by-product of the reaction for producing the PTT). In the method of the present invention, these requirements are satisfied by performing the polymerization by allowing a prepolymer to fall along and in contact with the guide at an appropriate temperature under reduced pressure to thereby increase the surface area of the prepolymer. Further, by allowing the polymer to fall along and in contact with a guide, it becomes possible to prevent the disadvantageous fluctuation of qualities of the products, wherein the fluctuation occurs due to the breakage of the polymer flow in the polymerizer.

Secondly, for preventing the discoloration of the polymer which is caused by the entrance of oxygen and a sealing liquid into the polymer, it is required to employ a polymerizer having no rotary driving part at a portion of the polymerizer, which portion contains a gaseous phase during the polymerization. In the guide-wetting fall process, there is no need for the polymerizer to have a rotary driving part in such a gaseous phase portion of the polymerizer, and the polymerizer exhibits an excellent sealability under a highly vacuumized condition, so that a discoloration caused by leakage of oxygen into the polymerizer can be almost completely prevented. Further, since the polymerizer has no rotary driving part, a mixing of a sealing liquid into a polymer would not occur, and the maintenance of the polymerizer is easy. Thus, a high quality polytrimethylene terephthalate which is free from a disadvantageous discoloration can be obtained.

Thirdly, for stably producing a polytrimethylene terephthalate resin on a commercial scale, it is required to suppress the foaming of the prepolymer introduced into the polymerization reaction zone, so as to prevent the staining of the lower surface of the perforated plate and inner wall of the polymerizer. In the method of the present invention, this requirement is satisfied by introducing a prepolymer having an increased viscosity, more specifically by polymerizing a prepolymer having a high intrinsic viscosity within a specific range at a specific low temperature. By virtue of this feature, it becomes possible to suppress the lowering of the quality of the polytrimethylene terephthalate resin, which is caused by the mixing or entrance of the stain into the polytrimethylene terephthalate resin.

Thus, by the method of the present invention, the problems accompanying the conventional techniques for performing a melt-polycondensation to produce a polytrimethylene terephthalate resin can be solved, and it becomes possible to produce resin which is free from a discoloration caused by heat decomposition, and which has high quality and high polymerization degree. Such effects are unexpected from the conventional techniques for performing polymerization reactions for producing polyamides and the other types of polyesters.

In the present invention, it is necessary to introduce a trimethylene terephthalate prepolymer in a molten form through the holes of the perforated plate into the polymerization reaction zone at a temperature which is equal to or higher than the crystalline melting point of the prepolymer and is not higher than 290° C., wherein the prepolymer has an intrinsic viscosity [η] of from 0.2 to 2 dl/g.

In the present invention, the "trimethylene terephthalate prepolymer" means a polycondensation product which has a molecular weight lower than the final polytrimethylene terephthalate resin obtained therefrom.

In the present invention, it is important to suppress the scattering of the prepolymer in the polymerization reaction zone, which is caused by the vigorous foaming of the prepolymer. In the present invention, for suppressing the scattering of the prepolymer, and for effectively removing the by-produced TMG from the reaction system, it is essential to introduce the above-mentioned prepolymer having a specific intrinsic viscosity [η] into the polymerization reaction zone at the above-mentioned specific temperature. When the scattering of the prepolymer is caused by the vigorous foaming of the prepolymer introduced through the holes of the perforated plate into the polymerization reaction zone, the polymer adheres to the lower surface of the perforated plate and the inner wall of the polymerizer, thereby staining them. The prepolymer which adheres to the lower surface of the perforated plate and the inner wall of the polymerizer remains in the polymerizer for a long period of time, and hence, suffers heat decomposition to form a discolored low molecular weight product and/or a discolored modified product. When such discolored products get mixed with the final polytrimethylene terephthalate resin, the quality of the resin is lowered. For suppressing the scattering of the prepolymer caused by the vigorous foaming thereof, it is necessary that the prepolymer has an intrinsic viscosity [η] of 0.2 or more. Further, for constantly producing a resin having a narrow molecular weight distribution, it is preferred that the prepolymer has a high viscosity. The reason for this is as follows. In the guide-wetting fall process employed in the present invention, a fluctuation of polymerization degree of the prepolymer being polymerized may occur due to the fluctuation of the falling rate of the prepolymer and the fluctuation of the level of surface renewal of the prepolymer, leading to a broad molecular weight distribution of the final resin. For preventing such fluctuation of the falling rate of the prepolymer and fluctuation of the level of surface renewal of the prepolymer, it is preferred that the viscosity of the prepolymer is high.

However, on the other hand, when the prepolymer has too high an intrinsic viscosity, it becomes difficult to withdraw efficiently the by-produced TMG from the reaction system. Further, when the intrinsic viscosity is too high, the amount of the by-produced TMG becomes extremely small, so that it becomes difficult to cause an appropriately mild foaming of the prepolymer during the fall thereof in the polymerizer, which foaming of the prepolymer is an important feature of the polymerization method of the present invention. Thus, it becomes difficult to improve the polymerization degree of the polytrimethylene terephthalate resin.

For preventing the above disadvantages, it is necessary that the prepolymer has an intrinsic viscosity [η] of 2 dl/g or less. It is preferred that the prepolymer has an intrinsic viscosity [η] of from 0.3 to 1.8 dl/g, more advantageously from 0.4 to 1.5 dl/g.

In addition, for preventing disadvantages (e.g., vigorous foaming of the prepolymer, and heat decomposition of the prepolymer) which are caused by the low viscosity of the prepolymer and which lead to a lowering of the quality of the polytrimethylene terephthalate resin, it is necessary that the temperature of the prepolymer introduced into the polymerization reaction zone be 290° C. or less. On the other hand, for uniformly introducing the prepolymer into the polymerization reaction zone without solidifying the prepolymer in the holes of the perforated plate, and for causing the prepolymer as a whole to fall uniformly along and in contact with the guide without partially solidifying the prepolymer during the fall thereof, it is necessary that the temperature of the prepolymer introduced into the polymerization reaction zone be equal to or higher than the crystalline melting point of the prepolymer.

In the present invention, the crystalline melting point of the prepolymer means a temperature at which an endothermic peak ascribed to the melting of a crystal is observed in a differential scanning calorimetry (DSC) chart of the prepolymer, wherein the DSC chart is obtained by means of an input compensation-type differential scanning calorimeter (trade name: Pyris 1; manufactured and sold by Perkin Elmer, Inc., U.S.A.) under the following conditions:

Measuring temperature: 0 to 280° C., and
Rate of temperature elevation: 10° C./min.

The temperature of the prepolymer introduced into the polymerization reaction zone is preferably 5° C. or more higher than the crystalline melting point of the prepolymer and not higher than 280° C., more preferably 10° C. or more higher than the crystalline melting point of the prepolymer but not higher than 275° C., still more preferably 15° C. or more higher than the crystalline melting point of the prepolymer but not higher than 265° C.

In the present invention, the above-mentioned perfirated plate is a plate having a plurality of through-holes through which the prepolymer is introduced into the polymerization reaction zone. There is no particular limitation with respect to the thickness of the perforated plate. However, the thickness of the perforated plate is generally in the range of from 0.1 to 300 mm, preferably from 1 to 200 mm, more preferably from 5 to 150 mm. The perforated plate needs to have a strength sufficient to sustain the pressure inside the chamber of the polymerizer, into which the molten prepolymer is fed. Also, when the guide(s) in the polymerization reaction zone of the polymerizer is (are) hung from the perforated plate, it is necessary that the perforated plate can sustain the weight of the guide(s) and the molten prepolymer which is falling along and in contact with the surface of the guide(s). For this reason, it is preferred that the perforated plate is reinforced with a rib. The shape of the hole of the perforated plate is generally selected from a circle, an ellipse, a triangle, a slit, a polygon, a star and the like. The area at the opening of each hole is generally in the range of from 0.01 to 100 cm$^2$, preferably from 0.05 to 10 cm$^2$, more preferably from 0.1 to 5 cm$^2$. Further, nozzles or the like may be attached to the holes of the perforated plate. The distance between mutually adjacent holes of the perforated plate is generally from 1 to 500 mm, preferably from 25 to 100 mm, as measured between the respective centers of the mutually adjacent holes. The perforated plate may have tubes attached thereto, such that the hollow portions of the tubes serve as the holes of the perforated plate. Further, the hole of the perforated plate may have a tapered configuration. It is preferred that the size and shape of the hole are determined so that the pressure loss which occurs when the molten form of a prepolymer passes through the perforated plate is from 0.01 to 5 MPa, more preferably from 0.1 to 5 MPa. When the pressure loss is in the above-mentioned range, it becomes easy to obtain a resin having a further improved polymerization degree (the reason for this is not clear). In general, it is preferred that the material used for the perforated plate is selected from the group consisiting of metallic materials, such as stainless steel, carbon steel, Hastelloy, nickel, titanium, chromium and alloys other than mentioned.

Further, it is preferred that a filter is provided in the flowing path of the prepolymer in the polymerizer at a point which is upstream of the perforated plate. The reason for this is that the filter can be used for removing an impurity, if any, which is contained in the prepolymer, and which may cause the clogging of the holes of the perforated plate. The type of filter is appropriately selected so that the impurity having a size larger than the diameter of the holes of the perforated plate can be removed, and that the filter is not destroyed by the passage of the prepolymer therethrough.

Examples of methods for causing the molten prepolymer to pass downwardly through a perforated plate provided in the polymerizer and fall along and in contact with the guide include a method in which the prepolymer is allowed to fall only by liquid head or by gravity, and a method in which the prepolymer on the perforated plate is pressurized by using a pump or the like to thereby force the molten prepolymer to pass downwardly through a perforated plate. It is preferred that the fluctuation of the amount of falling prepolymer is suppressed by means of a pump which has a measuring ability, such as a gear pump.

There is no particular limitation with respect to the number of holes of the perforated plate. The appropriate number of holes of the perforated plate varies depending on the polymerization conditions (such as a polymerization temperature and a polymerization pressure), the amount of the catalyst used, the range of the molecular weight of the prepolymer, and the like. For example, when it is intended to produce the resin at a rate of 100 kg/hr, it is preferred that the perforated plate has 1 to $10^4$ holes, more advantageously 2 to $10^2$ holes.

In the present invention, it is necessary that the prepolymer which has been introduced through the holes of the perforated plate into the polymerization reaction zone is polymerized by allowing the prepolymer to fall along and in contact with the guide in the polymerization reaction zone under reduced pressure. It is preferred that the prepolymer in the polymerization reaction zone is in a foaming state such that the bubbles formed in the prepolymer in the polymerization reaction zone would not be broken instantaneously. It is especially preferred that the prepolymer at a lower portion of the guide is in a foaming state. Needless to say, it is most preferred that the whole of the prepolymer in the polymerization reaction zone is in a foaming state.

The guide used in the method of the present invention may be any of a wire, a chain, a wire mesh (each of the chain and the wire mesh is made by combining wires), a jungle gym-like body (having a lattice structure composed of wires), a flat or curved thin plate, a perforated plate, and a filler column (which is formed by regularly or irregularly piling fillers together).

For efficiently withdrawing TMG from the reaction system, it is preferred that the surface area of the falling prepolymer is increased. Therefore, it is preferred that the guide is a wire, a chain, a wire mesh or a jungle gym-like body. Further, for more efficiently withdrawing TMG from the reaction system to further improve the polymerization rate, it is especially preferred not only to increase the surface area of the guide, but also to form concave portion(s) and/or convex portion(s) on the surface of the guide which are arranged along the length thereof, so as to promote the agitation and surface renewal of the prepolymer falling along and in contact with the surface of the guide. Thus, it is preferred that the guide has at least one portion selected from the group consisting of a concave portion, a convex portion and a perforated portion. Specifically, it is preferred to use a guide having a structure which hampers the fall of the polymer, such as a chain, a jungle gym-like body or a wire having concavo-convex portions on the surface thereof along which the prepolymer falls. Needless to say, the above-mentioned guides can be used in combination.

In the present specification, the term "wire" means a body in which the ratio of the length of the body to the average perimeter of the cross-section of the body is very large. There is no particular limitation with respect to the cross-sectional area of the wire. However, in general, the cross-sectional area is in the range of from $10^{-3}$ to $10^2$ cm$^2$, preferably from $10^{-2}$ to $10^2$ cm$^2$, more preferably from $10^{-1}$ to 1 cm$^2$. There is no particular limitation with respect to the shape of the cross-section of the guide, and the shape is generally selected from a circle, an ellipse, a triangle, a quadrangle, a polygon, a star and the like. The shape of the cross-section of the wire may be uniform or may vary along the length of the wire. The wire may be hollow. Further, the wire may be made of a single strand, or made of a plurality of strands, wherein, for example, the strands are twisted together. The surface of the wire may be smooth or may have concavo-convex portions as mentioned above, a locally protruding portion or the like. There is no particular limitation with respect to the material used for the wire, but the material is generally selected from the group consisting of, for example, stainless steel, carbon steel, Hastelloy, nickel, titanium, chromium and other alloys. If desired, the wire may be subjected to surface treatment. Examples of surface treatments include plating, lining, passivation, and washing with an acid.

The "wire mesh" means a body which is made by combining the above-mentioned wires so as to form a lattice. The wires can be linear or curved, and the angle between the combined wires can be appropriately selected. With respect to the area ratio of the wires of the wire mesh to the open spaces (which ratio is measured with respect to the projected image of the wire mesh), there is no particular limitation, but the area ratio is generally in the range of from 1/0.5 to 1/1,000, preferably from 1/1 to 1/500, more preferably from 1/5 to 1/100. It is preferred that the area ratio of the wire mesh does not vary horizontally relative to the vertical direction of the wire mesh. Further, it is preferred that the area ratio of the wire mesh along the vertical length of the wire mesh does not vary or varies such that, when the wire mesh is provided as the guide in the polymerizer, the area of each open space at a lower portion of the wire mesh becomes smaller than that at an upper portion of the wire mesh (which means that the area ratio at a lower portion of the wire mesh becomes larger than that at an upper portion of the wire mesh).

In the present invention, the "chain" means a body in which rings formed by the above-mentioned wires are linked together. The shape of rings can be a circle, an ellipse, a rectangle, a square or the like. The rings can be linked in one dimension, two dimensions or three dimensions.

In the present invention, the term "jungle gym-like body" means a material in which the above-mentioned wires are three-dimensionally combined with one another so as to form a lattice. The wires used can be linear or curved, and the angle between the combined wires can be appropriately selected.

Examples of wires having convex portion(s) and/or concave portion(s) on the surface thereof (along and in contact with which the prepolymer is allowed to fall) include a wire to which a rod having a circular or polygonal cross-section is attached such that the rod extends substantially vertically of the wire, and a wire to which a disc-shaped or cylindrical-shaped body is attached such that the wire penetrates through the disc-shaped or cylindrical-shaped body around the center thereof. It is preferred that the convex portion has a height which is at least 5 mm larger than the diameter of the wire. As a specific example of wires having convex portion(s), there can be mentioned a wire to which a plurality of discs are attached at intervals of from 1 to 500 mm, in which each disc has a diameter which is at least 5 mm larger than the diameter of the wire and not more than 100 mm, and a thickness of from approximately 1 to 10 mm.

With respect to the chain, jungle gym-like body and wire having concavo-convex portions on the surface thereof, which are used as the guides, there is no particular limitation on the volume ratio of the skeleton of the guide (e.g., wires used to form the guide) to the open spaces in the guide. However, in general, the volume ratio is in the range of from 1/0.5 to 1/10$^7$, preferably from 1/10 to 1/10$^6$, more preferably from 1/10$^2$ to 1/10$^5$. It is preferred that the volume ratio does not vary horizontally of the downwardly extending guide. Further, it is preferred that the volume ratio of the downwardly extending guide along the length of the guide does not vary or varies such that, when the guide is provided in the polymerizer, the volume ratio at a lower portion of the guide becomes larger than that at an upper portion of the guide.

The above-mentioned guides can be used individually or in combination, depending on the configuration of the guides. When the guide is a wire or a linear chain, the number of guide(s) used is generally in the range of from 1 to 100,000, preferably from 3 to 50,000. When the guide is a wire mesh, a chain formed by two-dimensionally combining the wires, a thin plate or a perforated plate, the number of guide(s) used is generally in the range of from 1 to 1,000, preferably from 2 to 100. When the guide is a chain formed by three-dimensionally combining the wires, a jungle gym-like body or a filler column, the number of the guide(s) can be appropriately selected depending on the sizes of the polymerizer and the polymerization reaction zone where the guide(s) is (are) provided.

When a plurality of guides are used, it is preferred to arrange the guides so as for the guides not to contact with each other by using a spacer or the like.

In the present invention, in general, the prepolymer is introduced through at least one hole of the perforated plate into the polymerization reaction zone where the prepolymer is allowed to fall along and in contact with the guide. The number of holes of the perforated plate can be appropriately selected depending on the shape of the guide. In the method of the present invention, the prepolymer which has passed through a single hole of the perforated plate can be allowed to fall along and in contact with a plurality of guides. However, for causing the prepolymer to fall uniformly so as to obtain a resin having a narrow molecular weight distribution constantly, it is preferred that the number of guide(s) along which the prepolymer (which has passed through a single hole of the perforated plate) is allowed to fall is small. For example, when the guide is a wire, it is preferred that the number of guide(s) along which the prepolymer (which has passed through a single hole of the perforated plate) is allowed to fall is 3 or less. There is no particular limitation with respect to the position of the guide(s) in the polymerizer so long as the prepolymer can fall along and in contact with the guide(s), and the guide(s) can be provided such that the guide passes through the hole of the perforated plate or is hung below the hole of the perforated plate.

With respect to the distance over which the molten prepolymer (having passed through the holes of the perforated plate) falls along and in contact with the surface of the guide, the distance is preferably from 0.3 to 50 m, more preferably from 0.5 to 20 m, still more preferably from 1 to 10 m.

The flow rate of prepolymer passing through the holes of the perforated plate is preferably in the range of from $10^{-2}$ to $10^{-2}$ liters/hr per hole of the perforated plate, more preferably from 0.1 to 50 liters/hr per hole of the perforated plate. When the flow rate of prepolymer is within the above-mentioned range, it becomes possible to prevent a marked lowering of the polymerization rate and the productivity of the final resin.

In the method of the present invention, it is preferred that the average falling time of the prepolymer is in the range of from 10 seconds to 100 hours, more preferably from 1 minute to 10 hours, still more preferably from 5 minutes to 5 hours, most preferably from 20 minutes to 3 hours.

In the method of the present invention, as mentioned above, it is necessary that the polymerization reaction (performed by allowing the prepolymer to fall along and in contact with the guide) be performed under reduced pressure. By performing the polymerization reaction under reduced pressure, TMG (which is by-produced during the polymerization reaction) is efficiently withdrawn from the reaction system so as to advance the polymerization reaction. The reduced pressure means a pressure which is lower than the atmospheric pressure. Generally, it is preferred that the polymerization is conducted under a pressure of 100,000 Pa or less, more preferably 10,000 Pa or less, still more preferably 1,000 Pa or less, most preferably 100 Pa or less. There is no particular limitation with respect to the lower limit of the pressure under which the polymerization is conducted. However, from the viewpoint of the size of the equipment for reducing the pressure in the reaction system, it is preferred that the pressure is 0.1 Pa or more.

Further, an inert gas which does not adversely affect the polymerization reaction can be introduced into the reaction system under reduced pressure, so as to remove the by-produced TMG in such a form as entrained by the inert gas. In the method of the present invention, the inert gas is generally used in an amount of from 0.005 to 100 mg per gram of the polytrimethylene terephthalate resin withdrawn from the polymerization reaction zone.

Conventionally, it has been understood that the introduction of inert gas into a polycondensation reaction system lowers the partial pressure of a by-product formed during the polycondensation reaction, thereby displacing the equilibrium of the reaction in the direction of the desired product formation. However, in the present invention, the inert gas is introduced into the reaction zone only in a very small amount, and hence, the improvement of the polymerization rate by the lowering of partial pressure of a by-product cannot be expected. Thus, from the conventional understanding, the function of the inert gas used in the method of the present invention cannot be explained. From the studies of the present inventors, it has surprisingly been found that the introduction of inert gas into the polymerization reaction zone causes an appropriately mild foaming of the molten prepolymer on the guide, so that not only is the surface area of the molten prepolymer greatly increased, but also the surface renewal of the prepolymer vigorously occurs without staining the inner wall of the polymerizer. It is presumed that a vigorous movement of the prepolymer at various portions (including inner and surface portions) thereof causes the remarkable improvement in the polymerization rate.

As the inert gas introduced into the polymerization reaction zone, it is preferred to use inert gas which does not cause discoloration, denaturation or decomposition of the polymer. Preferred examples of inert gases include nitrogen gas, argon gas, helium gas, carbon dioxide gas and a lower hydrocarbon gas. Needless to say, a mixture of the above mentioned gases can also be used in the present invention. As the inert gas, it is more preferred to use nitrogen gas, argon gas, helium gas and/or carbon dioxide gas. Among these gases, nitrogen gas is most preferred from the viewpoint of availability.

In the present invention, the amount of inert gas introduced into the polymerization reaction zone may be very small. Specifically, it is preferred that the amount of inert gas is in the range of from 0.05 to 100 mg per gram of the final resin withdrawn from the polymerization reaction zone. By using the inert gas in an amount of 0.05 mg or more per gram of the final resin withdrawn from the polymerization reaction zone, it becomes possible to foam the polymer satisfactorily so as to increase the polymerization degree. On the other hand, by using the inert gas in an amount of 100 mg or less, it becomes easy to maintain the appropriate reduced pressure in the polymerization reaction zone. It is preferred that the amount of inert gas introduced into the polymerization reaction zone is in the range of from 0.1 to 50 mg per gram of the final resin withdrawn from the polymerization reaction zone, more advantageously from 0.2 to 10 mg.

Examples of methods for introducing the inert gas into the polymerization reaction zone include a method in which at least a part of the inert gas is introduced to the polymerization reaction zone, independently from the feeding of the trimethylene terephthalate prepolymer to the polymerization reaction zone, and a method in which at least a part of the inert gas is introduced to the polymerization reaction zone in such a form as absorbed and/or contained in the trimethylene terephthalate prepolymer, such that the inert gas is caused to be discharged from the prepolymer under reduced pressure in the polymerization reaction zone. These two methods can be used individually or in combination.

In the present invention, it is preferred to employ the above-mentioned method in which at least a part of the inert gas is introduced to the polymerization reaction zone in such a form as absorbed by the trimethylene terephthalate prepolymer or in such a form as contained in the trimethylene terephthalate prepolymer. The former means that the inert gas is dissolved in the prepolymer, and is not present in the form of bubbles in the prepolymer. On the other hand, the latter means that the inert gas is present in the form of bubbles in the prepolymer. When the inert gas is present in the form of bubbles in the prepolymer, it is preferred that the size of each bubble is as small as possible. It is preferred that the average diameter of each bubble is 5 mm or less, more advantageously 2 mm or less.

When the inert gas is introduced to the polymerization reaction zone, independently from the feeding of the prepolymer to the polymerization reaction zone, it is preferred to feed the inert gas to the polymerizer at a position remote from the perforated plate and close to the outlet for withdrawing the final resin. Further, it is preferred to feed the inert gas to the polymerizer at a position remote from the vent to which a vacuum gas discharge line is connected.

On the other hand, examples of methods for causing the inert gas to be absorbed by and/or contained in the prepolymer include a method using any of conventional absorption devices, such as a packed column type absorption device, a tray-containing column type absorption device, a spraying device-containing column type absorption device (in which a liquid is sprayed in a gas to be absorbed in the liquid), a turbulent contact absorption device, a gas-liquid film cross-contacting type absorption device, a high-speed rotary flow type absorption device, an absorption device utilizing mechanical force, which are described in "Kagaku Souchi Sekkei-Sousa Shiriizu No. 2, Kaitei Gasu Kyushu (Design and Operation of Chemical Devices, No. 2, Gas Absorption (Revised Version))", pp. 49–54 (published on March 15, 1981 by Kagaku Kogyosha, Inc., Japan); and a method in which the inert gas is injected into the prepolymer in a conduit for transferring the prepolymer to the polymerizer. Most preferred is a method using a device in which the prepolymer is allowed to fall along and in contact with the surface of a guide in an atmosphere of inert gas to thereby cause the prepolymer to absorb the inert gas during the fall thereof. In this method, inert gas having a pressure higher than the pressure inside the polymerizer is introduced into the gas absorption device. The pressure of the inert gas introduced into the gas absorption device is preferably from 0.01 to 1 MPa, more preferably from 0.05 to 0.5 MPa, still more preferably from 0.1 to 0.2 MPa.

In both of the above-mentioned methods for introducing the inert gas into the polymerization reaction system, it is preferred that at least a part of the prepolymer falling in the polymerization reaction zone is in a foaming state. It is especially preferred that the prepolymer at a lower portion of the polymerization reaction zone is a forming state. Needless to say, it is most preferred that the whole of the prepolymer falling in the polymerization reaction zone is in a foaming state. In the present invention, the "foaming state" encompasses both a state in which the formed bubbles are immediately broken and a state in which the formed bubbles are maintained for a relatively long time.

In the method of the present invention, it is necessary that the temperature in the polymerization reaction zone is equal to or higher than the crystalline melting point of the prepolymer, and not higher than 290° C. By performing the polymerization reaction at a temperature which is equal to or higher than the crystalline melting point of the prepolymer, it becomes easy to cause the prepolymer to fall stably without causing the prepolymer to get too viscose or solidified. Further, by performing the polymerization reaction at a temperature which is not higher than 290° C., a discoloration of the prepolymer caused by heat decomposition of the prepolymer is suppressed, and hence, a polytrimethylene terephthalate resin having high quality can be easily obtained. It is preferred that the difference between the temperature in the polymerization reaction zone (which is within the above-mentioned range) and the temperature of the molten prepolymer introduced into the polymerization reaction zone through the perforated plate is 20° C. or less, more advantageously 10° C. or less, still more advantageously 5° C. or less, and it is most preferred that the temperature in the polymerization reaction zone and the temperature of the molten prepolymer introduced into the polymerization reaction zone are the same. The temperature in the polymerization reaction zone can be controlled by adjusting the temperature of a heater or a jacket which is provided on the inner wall of the polymerizer, or by adjusting the temperature of a heater or a heating medium which is provided inside the guide.

In the present invention, for improving the polymerization rate, it is preferred that the prepolymer contains a polycondensation catalyst.

Examples of polycondensation catalysts include titanium alkoxides, such as titanium tetrabutoxide and titanium tetraisopropoxide; titanium compounds, such as titanium dioxide and a double salt of titanium dioxide and silicon dioxide; antimony compounds, such as diantimony trioxide and antimony acetate; and tin compounds, such as butyl stannate, butyltin tris(2-ethylhexoate) and tin 2-ethylhexanoate. Of these, titanium tetrabutoxide and tin 2-ethylhexanoate are especially preferred from the viewpoint of improvement in the polymerization reaction rate and the color of the final resin. These catalysts can be used individually or in combination. It is preferred that the polycondensation catalyst is contained in the prepolymer in an amount of from 0.001 to 1% by weight, more advantageously from 0.005 to 0.5% by weight, still more advantageously from 0.01 to 0.2% by weight, based on the weight of the prepolymer.

In the present invention, for obtaining a polytrimethylene terephthalate resin having a very high molecular weight, it is preferred that the polymerization degree of the prepolymer is increased, and that the terminal carboxyl group ratio of the prepolymer is lowered, wherein the terminal carboxyl group ratio is a molar ratio (%) of the terminal carboxyl groups at the terminals of the prepolymer to the total of terminal groups of the prepolymer. It is preferred that the prepolymer has an intrinsic viscosity [η] of 0.5 or more. By using a prepolymer having such a high intrinsic viscosity, it becomes possible to obtain a desirable falling rate of the prepolymer and a desirable foaming state of the prepolymer, thereby greatly improving the polymerization rate. It is preferred that the prepolymer has an intrinsic viscosity [η] of 0.55 or more, more preferably 0.60 dl/g or more.

On the other hand, it is preferred that the prepolymer has a terminal carboxyl group ratio of 50% or less. The terminal carboxyl group ratio is calculated by the following formula:

Terminal carboxyl group ratio(%) =
 (terminal carboxyl group content)/(total terminal group content) × 100 wherein:
the terminal carboxyl group content is the molar amount of carboxyl group per kg of a sample, and
the total terminal group content is the total molar amount of terminal groups per kg of a sample.

When the terminal carboxyl group ratio is 50% or less, the polymerization reaction rate can be improved, so that a resin having a high molecular weight can be obtained and that a discoloration of the resin can be suppressed. The terminal carboxyl group ratio is more preferably 30% or less, still more preferably 20% or less, most preferably 0%.

The above-mentioned prepolymer which is suitable for producing a resin having a high molecular weight has a high intrinsic viscosity. Therefore, when such a prepolymer is used, it becomes difficult not only to withdraw TMG from the reaction system due to the high viscosity of the prepolymer, but also to produce the prepolymer by means of a conventional vertical agitation type polymerizer. In addition, for decreasing the terminal carboxyl group ratio of the prepolymer, it is necessary to improve the polymerization rate and suppress heat decomposition. Therefore, it is preferred that the prepolymer is produced by means of a horizontal agitation type polymerizer equipped with one or two stirrers, each having a large surface area and a high surface renewal efficiency.

The method of the present invention can be practiced in either a manner in which the prepolymer in a molten form is continuously fed into the polymerizer and introduced into the polymerization reaction zone through the holes of the perforated plate, and the prepolymer in a molten form is allowed to fall along and in contact with the guide to thereby perform a polymerization, and all of the resultant resin is withdrawn form the polymerizer; or a manner in which a part of the resin (obtained by the above-mentioned polymerization performed by allowing the prepolymer to fall along and in contact with the guide) is recycled to the polymerizer and subjected to further polymerization. However, it is preferred to employ the former (in which all of the obtained resin is withdrawn from the polymerizer). When the method of the present invention is practiced in the above-mentioned manner in which a part of the obtained resin is recycled to the polymerizer and subjected to further polymerization, for suppressing the heat decomposition of the resin which occurs at a reservoir portion of the polymerizer (i.e., a bottom portion of the polymerizer where the resin obtained by the polymerization is accumulated) and a conduit for recycling of the resin, it is preferred to reduce the retention times and lower the temperatures at the above-mentioned reservoir portion and conduit.

Hereinbelow, the method for producing a polytrimethylene terephthalate prepolymer which is used in the present invention is described in detail.

As representative examples of preferred methods for producing the polytrimethylene terephthalate prepolymer on a commercial scale, there are the following two methods which differ in the materials used. In one of the methods, a lower alcohol diester of terephthalic acid and TMG are subjected to transesterification reaction to obtain bis(3-hydroxylpropyl)terephthalate (hereinafter, referred to as "BHPT") which is an intermediate of a PTT, and the obtained BHPT is subjected to a polycondensation reaction, thereby obtaining a PTT prepolymer (hereinafter, this method is referred to as a "transesterification method"). In the other method, terephthalic acid and TMG are subjected to an esterification reaction to obtain BHPT, and the obtained BHPT is subjected to a polycondensation reaction as in the above-mentioned transesterification method, thereby obtaining a PTT prepolymer (hereinafter, this method is referred to as "direct esterification method").

Further, the production of the polytrimethylene terephthalate prepolymer can be performed in either a batchwise manner in which all of the raw materials are charged into the polymerizer at once and reacted together simultaneously to obtain a PTT prepolymer, or a continuous manner in which the raw materials are continuously fed into the polymerizer to continuously obtain a PTT prepolymer. In the present invention, it is preferred that the production of the PTT prepolymer is performed in a continuous manner, and that the resultant prepolymer is continuously polymerized by the method of the present invention.

In the present invention, the above-mentioned BHPT may contain unreacted raw materials (such as terephthalic acid, a lower alcohol diester of terephthalic acid and TMG) and a PTT oligomer. However, it is preferred that the BHPT comprises 70% by weight or more of the BHPT and/or a low molecular weight PTT oligomer, based on the total weight of the BHPT, and the above-mentioned unreacted raw materials and PTT oligomer.

Hereinbelow, explanations are made on some examples of the methods for obtaining the BHPT.

First, an explanation is made on the "transesterification method". In the transesterification method, the BHPT is produced by subjecting dimethyl terephthalate (hereinafter, referred to as "DMT") (which is a lower alcohol diester of terephthalic acid) and TMG to a transesterification reaction at 150 to 240° C. in the presence of a transesterification catalyst. In the transesterification reaction, the DMT used as a raw material exhibits a high volatility, so that it is preferred to use two or more reactors in combination, and to control the reaction temperature appropriately.

It is preferred that the lower alcohol diester of terephthalic acid and the TMG are charged into the reactor in a molar ratio (a lower alcohol diester of terephthalic acid/TMG molar ratio) of from 1/1.3 to 1/4, more advantageously from 1/1.5 to 1/2.5. When the amount of TMG is too small so that the above-mentioned ratio is larger than 1/1.3, the reaction time is likely to become disadvantageously long. Also when the amount of TMG is too large so that the above-mentioned ratio is smaller than 1/4, the reaction time is likely to become disadvantageously long, because it becomes necessary to volatilize the excess TMG.

In the transesterification method, it is necessary to use a transesterification catalyst. Preferred examples of transesterification catalysts include titanium alkoxides, such as titanium tetrabutoxide and titanium tetraisopropoxide; tin compounds, such as tin 2-ethylhexanoate; cobalt acetate; calcium acetate; and zinc acetate. Among these catalysts, titanium tetrabutoxide and tin 2-ethylhexanoate are preferred because they function also as catalysts in the subsequent polycondensation reaction to produce the final resin. The amount of transesterification catalyst is preferably in the range of from 0.02 to 1% by weight, more preferably from 0.05 to 0.5% by weight, still more preferably from 0.08 to 0.2% by weight, based on the weight of the diester of terephthalic acid.

Next, an explanation is made on the "direct esterification method". In the direct esterification method, the BHPT is produced by subjecting terephthalic acid and TMG to esterification reaction at 150 to 240° C.

It is preferred that the terephthalic acid and the TMG are charged into a reactor in a molar ratio (terephthalic acid/TMG molar ratio) of from 1/1.05 to 1/3, more preferably from 1/1.1 to 1/2. When the amount of TMG is too small so that the above-mentioned molar ratio is larger than 1/1.05, the reaction time is likely to become disadvantageously long and the resultant prepolymer is likely to be discolored. Also when the amount of TMG is too large so that the above-mentioned molar ratio is smaller than 1/3, the reaction time is likely to become disadvantageously long because it becomes necessary to volatilize the excess TMG.

In the direct esterification method, free protons derived from terephthalic acid function as a catalyst. Therefore, in the direct esterification method, an esterification catalyst is not always necessary. However, for improving the reaction rate, it is preferred to use an esterification catalyst. Preferred examples of esterification catalysts include titanium alkoxides, such as titanium tetrabutoxide and titanium tetraisopropoxide, and tin compounds, such as tin 2-ethylhexanoate. It is preferred that the amount of esterification catalyst used is from 0.02 to 1% by weight, more preferably from 0.05 to 0.5% by weight, still more preferably from 0.08 to 0.2% by weight, based on the weight of terephthalic acid.

For advancing the esterification reaction smoothly, it is preferred to add BHPT to a raw material mixture at the start of the reaction in an amount of 5 to 80% by weight, based on the total weight of the raw material mixture and the BHPT. When the production of BHPT is performed in a batchwise manner, the esterification reaction can be initiated by simultaneously charging the terephthalic acid and the TMG (raw materials) into a reactor. On the other hand, when the production of BHPT is performed in a continuous manner, the esterification reaction can be performed by continuously feeding a predetermined amount of a mixture of terephthalic acid and TMG into a reactor to perform a transesterification reaction, while withdrawing a predetermined amount of the reaction product (BHPT) from the reactor.

The BHPT obtained by any of the above-mentioned methods is then subjected to polycondensation, thereby obtaining the prepolymer used in the present invention.

The production of the prepolymer by polycondensation is performed by subjecting the BHPT to reaction at a predetermined temperature under reduced pressure or in an inert gas atmosphere, while withdrawing by-produced TMG from the reaction system.

It is preferred that such polycondensation reaction is performed at 230 to 280° C. When the reaction is performed at a temperature lower than 230° C., disadvantages are likely to occur that the formed prepolymer gets solidified and that the reaction time becomes long. On the other hand, when the reaction is performed at a temperature which is higher than 280° C., a disadvantage is likely to occur that a vigorous heat decomposition of the formed prepolymer occurs, and the resultant prepolymer cannot be used for producing a polymer having excellent color. It is preferred that the polycondensation reaction is performed at a temperature of from 232 to 275° C., more advantageously from 235 to 270° C.

As mentioned above, the polycondensation reaction can be performed under reduced pressure or in an inert gas atmosphere. When the reaction is performed under reduced pressure, the pressure is appropriately controlled, taking into consideration the sublimation of the BHPT and polycondensation product, and the reaction rate. When the reaction is preformed in an inert gas atmosphere, it is important that the inside of a reactor used is always satisfactorily purged with inert gas to withdraw the by-produced TMG efficiently from the reaction system.

When the BHPT is subjected to polycondensation, it is preferred to use a polycondensation catalyst. When a polycondensation catalyst is not used, the reaction time is likely to become disadvantageously long. Preferred examples of polycondensation catalysts include titanium alkoxides, such as titanium tetrabutoxide and titanium tetraisopropoxide; titanium dioxide and a double salt of titanium dioxide and silicon dioxide; antimony compounds, such as diantimony trioxide and an antimony acetate; and tin compounds, such as butyl stannate, butyltin tris(2-ethylhexoate) and tin 2-ethylhexanoate. From the viewpoint of improving the reaction rate and color of the final resin, titanium tetrabutoxide and tin 2-ethylhexanoate are especially preferred. The above-mentioned catalysts can be used individually or in combination. The amount of polycondensation catalyst used is preferably from 0.001 to 1% by weight, more preferably from 0.005 to 0.5% by weight, still more preferably from 0.01 to 0.2% by weight, based on the weight of the prepolymer. When a compound which functions as a polycondensation catalyst is used in the production process of the BHPT, it is preferred that the total amount of the compounds capable of functioning as a polycondensation catalyst is within the above-mentioned range.

Examples of devices for conducting such polycondensation reaction include a vertical agitation type polymerizer, a horizontal agitation type polymerizer equipped with one or two stirrers, a free-fall type thin film polymerizer having trays therein, and a thin film polymerizer in which the prepolymer is allowed to fall on a plane surface of an angled plate. Needless to say, these polymerizers can be used in combination.

When a polycondensation of BHPT is performed in a batchwise manner, a single polymerizer can be employed from the start of the polycondensation reaction through the completion of the polycondensation reaction. Needless to say, two or more polymerizers can be used. On the other hand, when a polycondensation of BHPT is performed in a continuous manner, for effectively advancing the reaction, it is preferred to perform the reaction of from the polycondensation to the formation of the prepolymer in a stepwise manner, using two or more different polymerizers, wherein the two or more polymerizers are operated under different temperature-pressure conditions.

In the present invention, if desired, various additives can be incorporated into the PTT resin by copolymerization or mixing. Examples of additives include a delustering agent, a thermal stabilizer, a flame retardant, an antistatic agent, an anti-foaming agent, an orthochromatic agent, an antioxidant, an ultraviolet absorber, a nucleating agent and a brightener. These additives can be added at any time during the production of the PTT resin.

In the present invention, from the viewpoint of improving the whiteness and melt stability of the PTT resin, and suppressing the formation of organic substances having a molecular weight of 300 or less, such as acrolein and an allyl alcohol, it is preferred that a stabilizer is added at an appropriate stage of the production of the PTT resin, more advantageously before the polycondensation of BHPT.

Preferred examples of such stabilizers include pentavalent and/or trivalent phosphorus compounds and hindered phenol compounds.

Examples of pentavalent and/or trivalent phosphorus compounds include trimethyl phosphate, triethyl phosphate, tributyl phosphate, triphenyl phosphate, trimethyl phosphate, triethyl phosphate, tributyl phosphate, triphenyl phosphate, phosphoric acid and phosphorous acid. Among the above-mentioned phosphorus compounds, trimethyl phosphate is especially preferred. It is preferred that the amount of phosphorus compound added is in the range of from 2 to 250 ppm by weight, more advantageously from 5 to 150 ppm by weight, still more advantageously from 10 to 100 ppm by weight, in terms of the weight of phosphorus atom contained in the PTT.

The hindered phenol compound is a phenol derivative which has a substituent exhibiting a steric hindrance at a position adjacent to the phenolic hydroxyl group, and has at least one ester bond in its molecule.

Examples of hindered phenol compounds include pentaerythritol-tetrakis[3-(3,5-di-tert-butyl-4-hydroxyphenyl) propionate], 1,1,3-tris(2-methyl-4-hydroxy-5-tert-butylphenyl)butane, 1,3,5-trimethyl-2,4,6-tris(3,5-di-tert-butyl-4-hydroxybenzyl)benzene, 3,9-bis{2-[3-(3-tert-butyl-4-hydroxy-5-methylphenyl)-propionyloxy]-1,1-dimethylethyl}-2,4,8,10-tetraoxaspiro[5,5]undecane, 1,3,5-tris(4-tert-butyl-3-hydroxy-2,6-dimethylbenzene) isophthalic acid, triethyl glycol-bis[3-(3-tert-butyl-5-methyl-4-hydroxyphenyl)-propionate], 1,6-hexanediol-bis[3-(3,5-di-tert-butyl-4-hydroxyphenyl)propionate], 2,2-thiodiethylene-bis[3-(3,5-di-tert-butyl-4-hydroxyphenyl) propionate] and octadecyl-3-(3,5-di-tert-butyl-4-hydroxyphenyl)-propionate].

Among the above-exemplified hindered phenol compounds, pentaerythritol-tetrakis[3-(3,5-di-tert-butyl-4-hydroxyphenyl)propionate] is preferred.

It is preferred that the amount of hindered phenol compound added is in the range of from 0.001 to 1% by weight, more advantageously from 0.005 to 0.5% by weight, still more advantageously from 0.01 to 0.1% by weight, based on the weight of the PTT resin. Needless to say, the above-mentioned stabilizers can be used in combination.

Next, preferred examples of the polymerizer used in the method of the present invention are described below, referring to the drawings.

FIG. 1 shows an explanatory diagrammatic view of a specific example of a polymerizer used in the method of the present invention. In FIG. 1, trimethylene terephthalate prepolymer A is fed through inlet 2 into polymerizer 10 by means of transferring pump 1. Then, prepolymer A is introduced through perforated plate 3 into the interior (polymerization reaction zone) of polymerizer 10, and is allowed to fall along and in contact with guides 5. The pressure in the interior (polymerization reaction zone) of polymerizer 10 is controlled so as to maintain a predetermined reduced pressure. If desired, inert gas E, such as nitrogen, can be introduced into the polymerizer through inlet 6 for a gas. TMG (which is distilled from the prepolymer) and inert gas E are discharged as exhaust gas D from vent 7. The resultant PTT resin B is withdrawn from the polymerizer by means of withdrawal pump 8 through outlet 9. Polymerizer 10 is heated by means of a heater or a jacket so as to maintain the temperature inside the polymerizer at a desired level.

Figure 2:
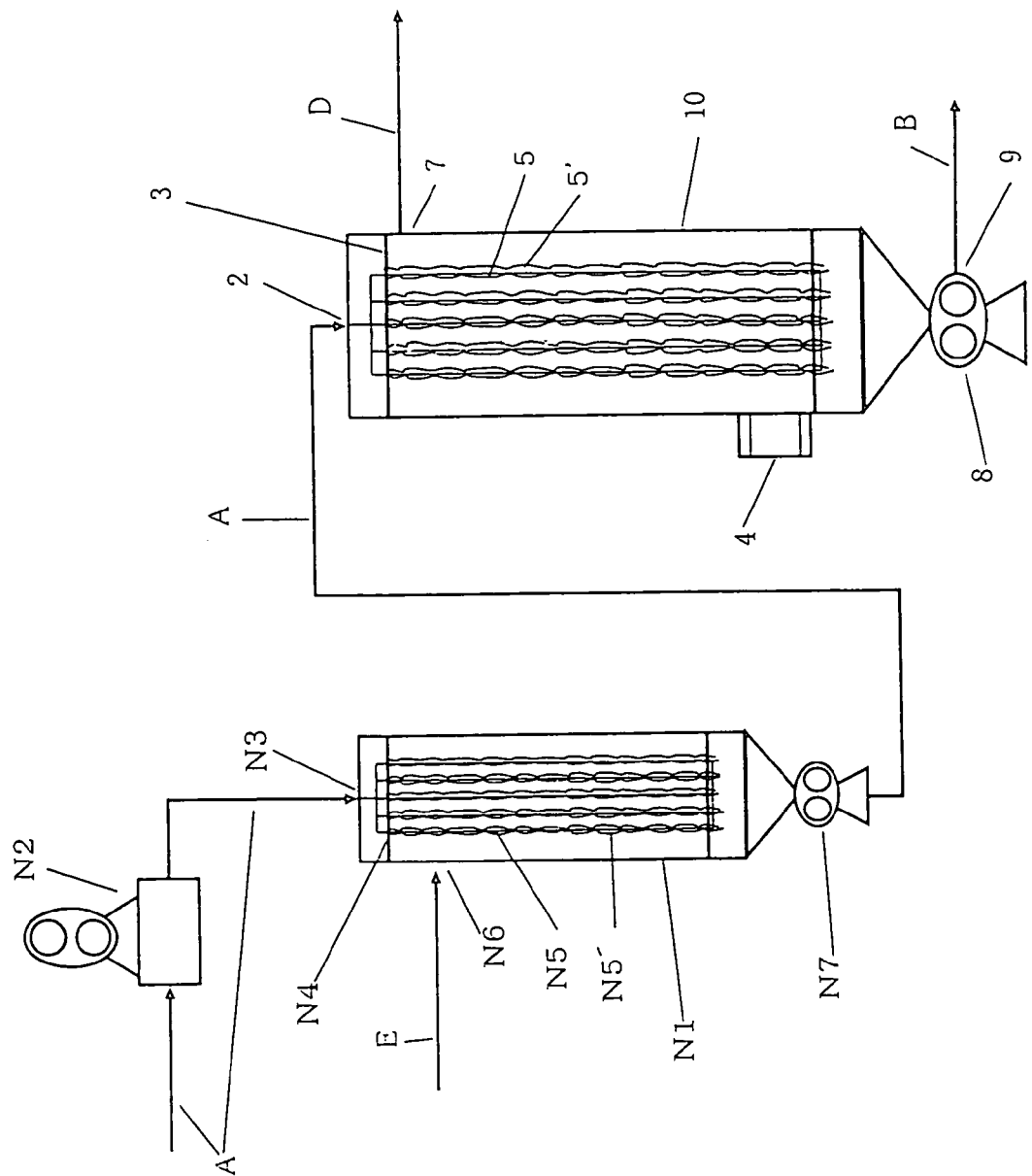
FIG. 2 shows explanatory diagrammatic views of examples of an inert gas absorption device and a reaction vessel, which can be used in the present invention; and Each of FIGS. 3 to 6 is an explanatory diagrammatic view of one form of a production system used for practicing the method of the present invention.

FIG. 2 shows explanatory diagrammatic views of specific examples of an inert gas absorption device and a polymerizer, which can be used in the present invention when the inert gas is introduced to the polymerization reaction zone in such a form as absorbed or contained in the PTT prepolymer, and the inert gas is caused to be released from the prepolymer in the polymerization reaction zone under reduced pressure. In FIG. 2, PTT prepolymer A is continuously fed through inlet N3 into the inert gas absorption device N1 by means of transferring pump N2. Then, the prepolymer is continuously fed through perforated plate 4 into the interior of the inert gas absorption device, into which inert gas E is introduced through inlet N6 for inert gas. In the inert gas absorption device, the prepolymer is allowed to fall along and in contact with guides 5. The resultant prepolymer (which contains and/or has absorbed therein the inert gas) is fed through inlet 2 into polymerizer 10 by means of transferring pump 7. The prepolymer is then continuously fed through perforated plate 4 into the interior (polymerization reaction zone) of polymerizer 10, and is allowed to fall along and in contact with guides 5.

The pressure in the interior (polymerization reaction zone) of polymerizer 10 is controlled so as to maintain a predetermined reduced pressure. The inert gas which is absorbed and/or contained in prepolymer A is released from the prepolymer in the polymerization reaction zone of the polymerizer. TMG (which is distilled from the prepolymer) and the inert gas (which is introduced into the polymerizer) are discharged as exhaust gas D through vent 7. The resultant PTT resin B is continuously withdrawn from outlet 9 by means of withdrawal pump 8. Inert gas absorption device N1 and polymerizer 10 are heated by means of a heater or a jacket so as to maintain the temperature inside the polymerizer at a desired level.

In each of the above-mentioned methods, the PTT resin (obtained by a polymerization performed by allowing the prepolymer to fall along and in contact with the guide) which is accumulated at the bottom portion of the polymerizer is withdrawn from the outlet by means of a withdrawal pump. It is preferred that the withdrawal of the PTT resin from the polymerizer is performed in a manner such that the amount of the PTT resin accumulated at the bottom portion of the polymerizer becomes as small as possible and constant. When the withdrawal of the PTT resin is performed in such a manner, it becomes easy to prevent the PTT resin from suffering disadvantages, such as discoloration (caused by heat decomposition), lowering of polymerization degree, and fluctuation of the quality. The amount of the PTT resin accumulated at the bottom portion of the polymerizer can be controlled by means of transferring pump 1 and withdrawal pump 8, while observing the amount of the PTT resin accumulated at the bottom portion of the polymerizer.

The polymerizer used in the present invention can be equipped with a stirrer at the bottom portion thereof, but such a stirrer is not necessary. Thus, in the method of the present invention, it is possible to perform a polymerization reaction using a polymerizer having no rotary driving part, so that the polymerizer can be tightly sealed even when a polymerization is performed under high vacuum conditions. The sealability of the rotary driving part of the withdrawal pump is improved due to the liquid head, as compared to that of a polymerizer having a rotary driving part.

The method of the present invention can be conducted using either a single polymerizer or a plurality of polymerizers. Further, it is also possible to use a multi-chamber polymerizer prepared by dividing an inner space of a single polymerizer into a plurality of horizontally adjacent chambers or a plurality of vertically adjacent chambers.

In the present invention, it is preferred to increase, in advance, the polymerization degree of the prepolymer (which is to be subjected to the above-mentioned guide-wetting fall polymerization process) to some extent by at least one polymerization method selected from the following methods (a) to (d):

(a) a polymerization method using a vertical agitation type polymerizer;
(b) a polymerization method using a horizontal agitation type polymerizer;
(c) a polymerization method using a free-fall polymerizer having a perforated plate; and
(d) a polymerization method using a thin film type polymerizer.

Examples of horizontal agitation type polymerizers include a screw-type polymerizer (such as a single-screw type polymerizer or a twin-screw type polymerizer) and an independent agitation element type polymerizer, which are described in "Hanno Kougaku Kenkyu-kai kenkyu Repoto: Riakutibupurosessingu Part 2 (Research Group on Reaction Engineering, Research Report: Reactive Processing Part 2)", Chapter 4, edited by The Society of Polymer Science, Japan, 1992.

With respect to the free-fall polymerizer having a perforated plate, reference can be made to, for example, U.S. Pat. No. 5,596,067. When the free-fall polymerizer is used, a polymerization is performed by allowing the prepolymer to fall freely from the holes of the perforated plate provided in the polymerizer. More specifically, a polytrimethylene terephthalate prepolymer in a molten form is allowed to fall freely from the holes of the perforated plate, thereby improving the polymerization degree of the prepolymer. Herein, the expression "fall freely" means that the prepolymer is allowed to fall without contacting any materials (such as a guide and an inner wall of the polymerizer) which obstruct the fall of the prepolymer. The prepolymer is allowed to fall freely in the form of a film, a fiber, a droplet, a fog or the like. TMG which is produced during the polycondensation reaction is withdrawn from the reaction system during the fall of the prepolymer.

In the above-mentioned method using a free-fall polymerizer, there is no particular limitation with respect to the shape of the holes of the perforated plate, and generally, the shape can be a circle, an ellipse, a triangle, a slit, a polygon, a star or the like. The cross-sectional area of each of the holes is generally in the range of from 0.01 to 100 $cm^2$, preferably from 0.05 to 10 $cm^2$, more preferably from 0.1 to 5 $cm^2$. Further, the holes can have a nozzle or a short guide attached thereto. However, it is necessary that the nozzle or the short guide is attached to the holes so that the prepolymer can fall freely after having passed through the nozzle or after having fallen along and in contact with the guide. The distance between mutually adjacent holes of the perforated plate is generally from 1 to 500 mm, preferably from 5 to 100 mm, as measured between the respective centers of the mutually adjacent holes. With respect to the distance over which the prepolymer (having passed through the holes of the perforated plate) falls freely, the distance is preferably from 0.3 to 50 m, more preferably from 0.5 to 20 m. The amount of prepolymer which is caused to pass through the holes varies depending on the molecular weight of the prepolymer, but is generally in the range of from $10^{-4}$ to $10^4$ liters/hr, preferably from $10^{-2}$ to $10^2$ liters/hr, more preferably from 0.1 to 50 liters/hr, per hole of the perforated plate. There is no particular limitation with respect to the time for allowing the prepolymer to fall freely from the perforated plate, but in general, it is in the range of from 0.01 second to 1 hour. The thus obtained prepolymer may be withdrawn from the polymerizer. Alternatively, the obtained prepolymer may be recycled to the free-fall polymerizer, and subjected to further free-fall polymerization. The recycling of the obtained prepolymer to the polymerizer has the following advantage. When the free-fall polymerization is performed while recycling the obtained prepolymer, the area of the prepolymer surface renewed per unit time is large, as compared to that in the case where the obtained prepolymer is not recycled. Therefore, by recycling the obtained polymer to the polymerizer, it becomes easy to achieve a desired degree of polymerization.

Further examples of vertical and horizontal agitation type polymerizers include those which are described in "Kagaku Souchi Binran (Handbook of Chemical Apparatuses)", Chapter 11, edited by The Society of Chemical Engineers, Japan, 1989. There is no particular limitation with respect to the shape of the vessel, and in general, the shape may be a vertical or horizontal cylinder. Further, there is no particular limitation with respect to the shape of the agitation element, and the shape of agitation element can be a paddle, an anchor, a turbine, a screw, a ribbon, double wings or the like.

Examples of thin film type polymerizers include a wall-wetting fall polymerizer, and polymerizers equipped with a centrifugal thin film type heat exchanger, a liquid film scraping type heat exchanger or the like. As an example of the above-mentioned wall-wetting fall polymerizer, there can be mentioned a polymerizer described in the above-mentioned "Kagaku Souchi Binran (Handbook of Chemical Apparatuses)", Chapter 11, p. 461, published by The Society of Chemical Engineers, Japan, 1989. The thin film type polymerizer may have a multi-tubular structure. Further, the prepolymer obtained by the wall-wetting fall may be recycled to the polymerizer, and subjected to further wall-wetting fall polymerization. Examples of liquid film scraping type heat exchangers and centrifugal thin film type heat exchangers include those which are described in "Netsukoukanki Sekkei Handobukku (Handbook for designing a heat exchanger)", Chapters 21–22, published by Kougakutosho Ltd., Japan, 1974.

The production of a prepolymer from the raw materials can be performed in either a batchwise manner or a continuous manner. When the prepolymer is produced in a batchwise manner, all of the raw materials or the whole of a reaction product (i.e., a prepolymer having a molecular weight lower than a desired level) are or is charged into a reaction vessel and reacted for a predetermined period of time, and then, the whole of the resultant reaction product is transferred to another reaction vessel. On the other hand, when the prepolymer is produced in a continuous manner, raw materials or a reaction product (i.e., a prepolymer having a molecular weight lower than a desired level) are or is continuously fed into a reaction vessel, while continuously withdrawing the resultant reaction product from the reaction vessel. For obtaining a large amount of a polytrimethylene terephthalate resin having a uniform quality, it is preferred that the production of the prepolymer is performed in a continuous manner.

With respect to the material of the polymerizer used in the present invention, there is no particular limitation. In general, the material is selected from the group consisting of, for example, stainless steel, nickel and glass lining.

Next, preferred examples of combinations of polymerizers which are used for producing a PTT resin from the raw materials are described below, referring to the drawings. However, the combinations of polymerizers usable in the present invention should not be limited to those examples.

Figure 3:
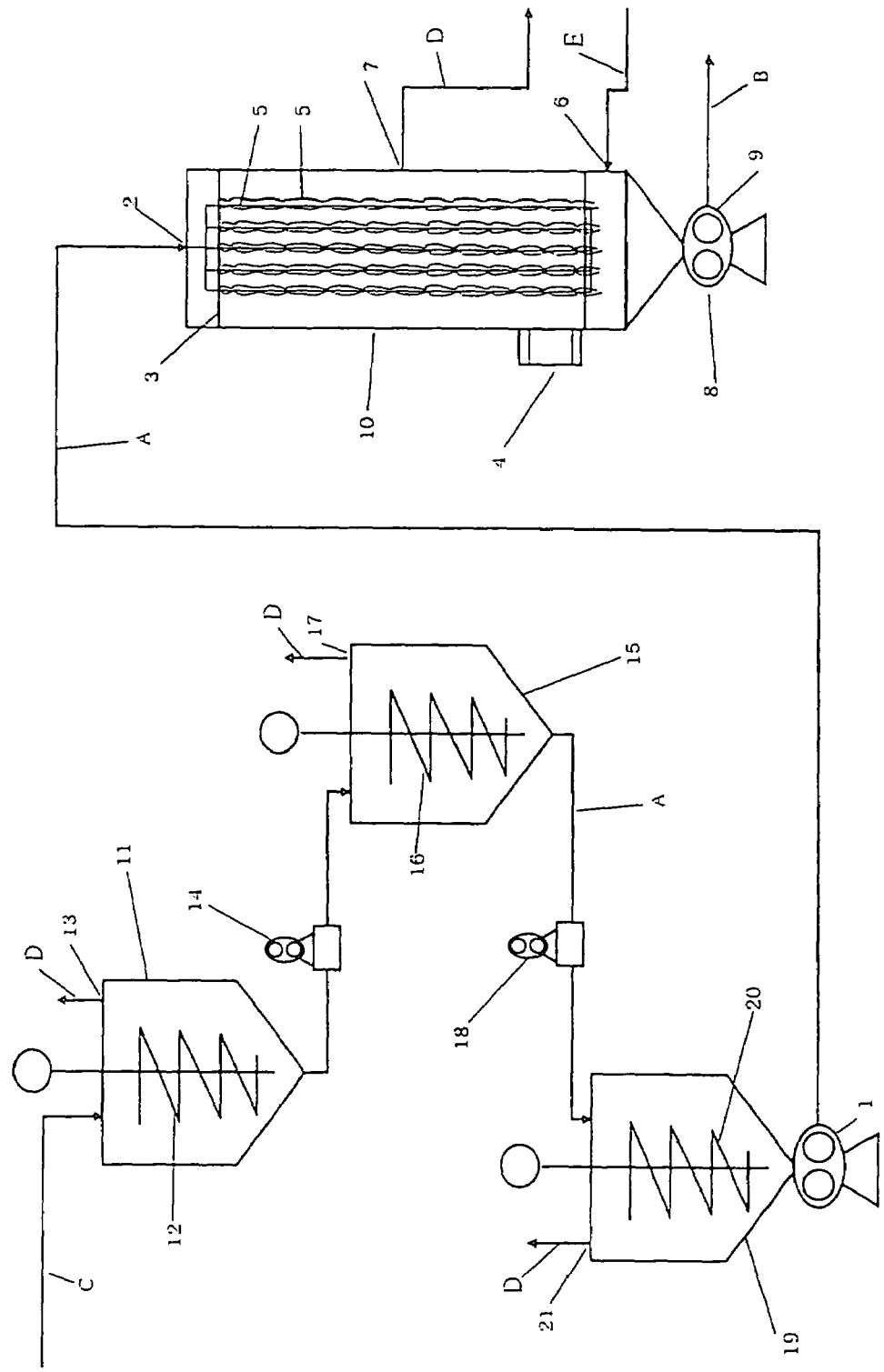

FIG. 3 shows an example of a system used for producing the PTT resin from terephthalic acid and TMG as raw materials, which system comprises a combination of vertical agitation type polymerizers and a polymerizer used for performing the guide-wetting fall process. In FIG. 3, mixture C containing raw materials (terephthalic acid and TMG) and a catalyst is charged into esterification reaction vessel 11, and subjected to an esterification reaction for a predetermined period of time, while stirring by means of agitation element 12, thereby obtaining bis(3-hydroxylpropyl)-terephthalate (BHPT). The atmosphere inside the reaction vessel is an atmosphere of inert gas, such as nitrogen gas, and/or an atmosphere containing water (steam) and/or TMG which are distilled from a reaction mixture in the reaction vessel. In general, the pressure inside the reaction vessel is controlled so as to be around atmospheric pressure. The water and TMG (which are distilled from the reaction mixture) and/or excess nitrogen gas are discharged from vent 13 as exhaust gas D. The BHPT obtained in esterification reaction vessel 11 is transferred by means of transferring pump 14 to first vertical agitation type polymerizer 15, where the BHPT is subjected to polymerization for a predetermined period of time, while stirring by means of agitation element 16, thereby obtaining a low molecular weight prepolymer A. The inside of the polymerizer is under reduced pressure, or inert gas (such as nitrogen gas) is flowed through the inside of the polymerizer. The water and TMG (which are distilled from polymer A) and/or excess nitrogen gas is discharged from vent 17 as exhaust gas D.

The low molecular weight prepolymer A obtained in first vertical agitation type polymerizer 15 is transferred by means of transferring pump 18 to second vertical agitation type polymerizer 19, where the prepolymer A is subjected to polymerization for a predetermined period of time, while stirring by means of agitation element 20, thereby obtaining a prepolymer. The inside of the polymerizer is under reduced pressure, or inert gas (such as nitrogen gas) is flowed through the inside of the polymerizer. The water and TMG (which are distilled from the prepolymer A) and/or excess nitrogen gas is discharged from vent 21 as exhaust gas D. The prepolymer A having an increased molecular weight, which is obtained in second vertical agitation type polymerizer 19, is transferred and continuously fed through inlet 2 into polymerizer 10 by means of transferring pump 1. In polymerizer 10, the prepolymer A is caused to pass through perforated plate 3, and is introduced into the interior (polymerization reaction zone) of the polymerizer, where the prepolymer A is allowed to fall along and in contact with guides 5. The pressure in the polymerization reaction zone is controlled so as to be a predetermined reduced pressure. TMG (distilled from the prepolymer A) and inert gas E (which is optionally introduced into the polymerizer through inlet 6 for a gas) if any, are discharged from vent 7. The obtained PTT resin B is continuously withdrawn from outlet 9 by means of withdrawal pump 8.

Esterification reaction vessel 11, first vertical agitation type polymerizer 15, second vertical agitation type polymerizer 19, polymerizer 10, conduits and transferring pumps are heated by means of a heater or a jacket so as to maintain the temperatures of the reaction vessel, polymerizers, conduits and pumps at desired levels.

Figure 4:
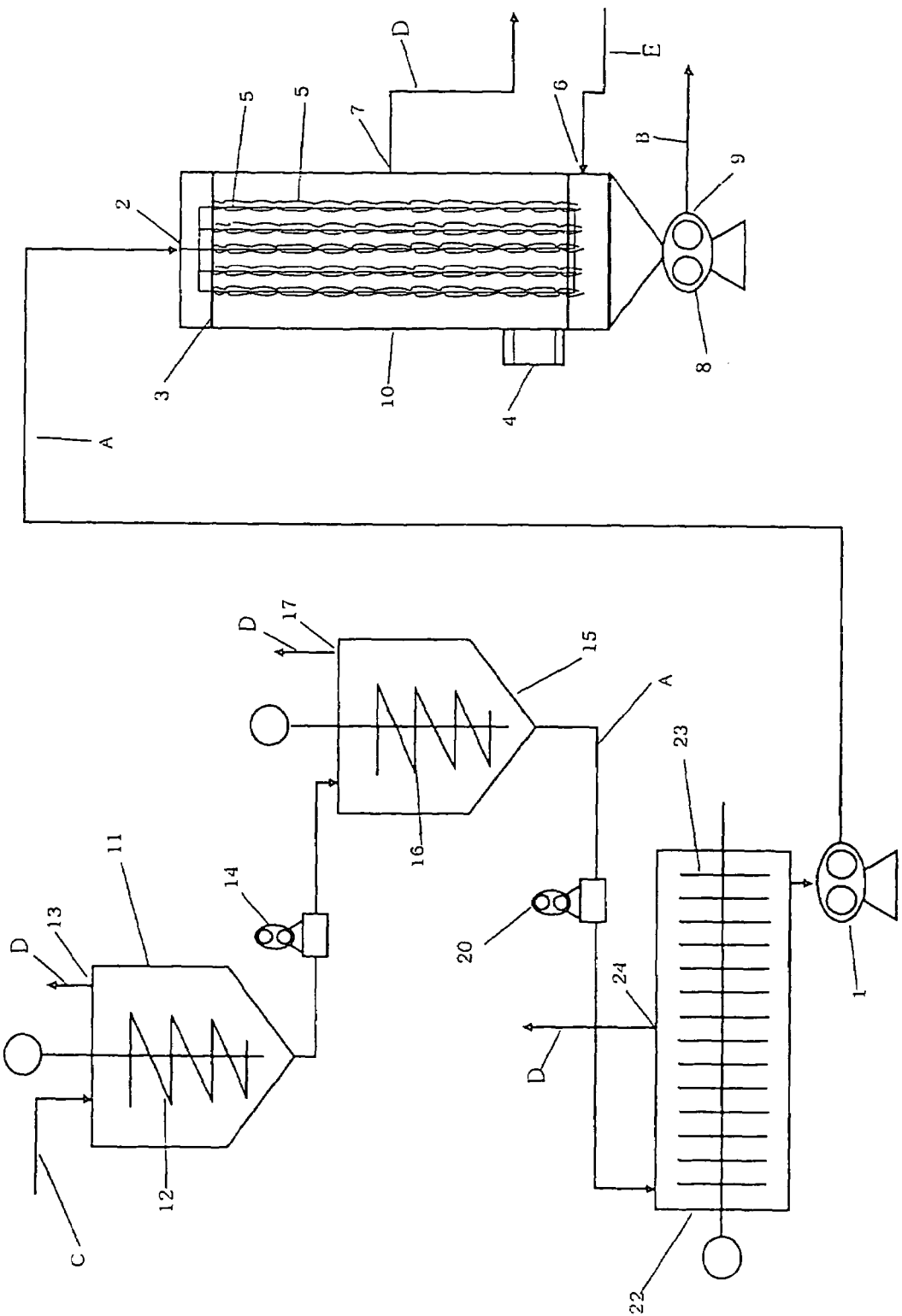

FIG. 4 shows an example of a system used for producing the PTT resin from terephthalic acid and TMG as raw materials, which system comprises a combination of a vertical agitation type polymerizer, a horizontal agitation type polymerizer and a polymerizer for performing the guide-wetting fall process. In FIG. 4, mixture C of raw materials (terephthalic acid and TMG) and a catalyst is charged into esterification reaction vessel 11, and subjected to an esterification reaction for a predetermined period of time, while stirring by means of agitation element 12, thereby obtaining BHPT. The atmosphere inside the reaction vessel is an atmosphere of inert gas, such as nitrogen gas, and/or an atmosphere containing water (steam) and/or TMG which are distilled from a reaction mixture in the reaction vessel. In general, the pressure inside the reaction vessel is controlled to approximately atmospheric pressure. The water and TMG (which are distilled from the reaction mixture) and/or excess nitrogen gas are discharged from vent 13 as exhaust gas D. The BHPT obtained in esterification reaction vessel 11 is transferred by means of transferring pump 14 to first vertical agitation type polymerizer 15, where the BHPT is subjected to polymerization for a predetermined period of time, while stirring by means of agitation element 16, thereby obtaining a low molecular weight prepolymer A. The inside of the polymerizer is under reduced pressure, or inert gas (such as nitrogen gas) is flowed through the inside of the polymerizer. The water and TMG (which are distilled from polymer A) and/or excess nitrogen gas is discharged from vent 17 as exhaust gas D.

The low molecular weight prepolymer A obtained in first vertical agitation type polymerizer 15 is transferred by means of transferring pump 20 to horizontal agitation type polymerizer 22, where the prepolymer A is subjected to polymerization for a predetermined period, while stirring by means of agitation element 23, thereby obtaining a prepolymer A having an increased molecular weight. The inside of the polymerizer is under reduced pressure, or inert gas (such as nitrogen gas) is flowed through the inside of the polymerizer. The water and TMG (which are distilled from polymer A) and/or excess nitrogen gas is discharged from vent 24 as exhaust gas D. The prepolymer A having an increased molecular weight, which is obtained in horizontal agitation type polymerizer 22, is transferred and continuously fed through inlet 2 into polymerizer 10 by means of transferring pump 1. In polymerizer 10, the prepolymer A is caused to pass through perforated plate 3, and is introduced into the interior (polymerization reaction zone) of the polymerizer, where the prepolymer A is allowed to fall along and in contact with guides 5. The pressure in the polymerization reaction zone is controlled to a predetermined reduced pressure. TMG (distilled from the prepolymer A) and inert gas E (which is optionally introduced into the polymerizer through inlet 6 for a gas) if any, are discharged from vent 7. The obtained PTT resin B is continuously withdrawn from outlet 9 by means of withdrawal pump 8.

Esterification reaction vessel 11, vertical agitation type polymerizer 15, horizontal agitation type polymerizer 22, polymerizer 10, conduits and transferring pumps are heated by means of a heater or a jacket so as to maintain the temperatures of the reaction vessel, polymerizers, conduits and pumps at desired levels.

Figure 5:
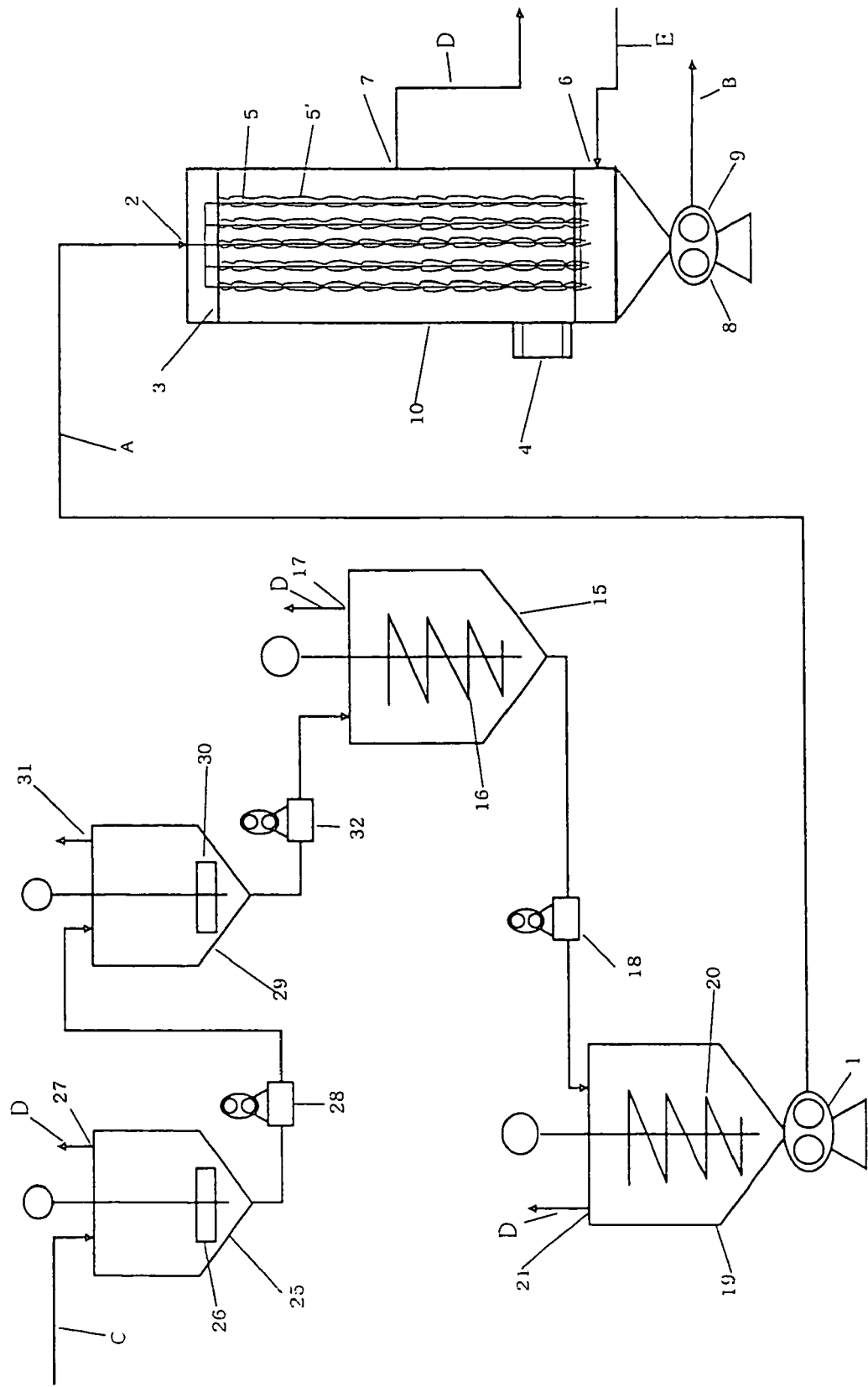
Figure 6:
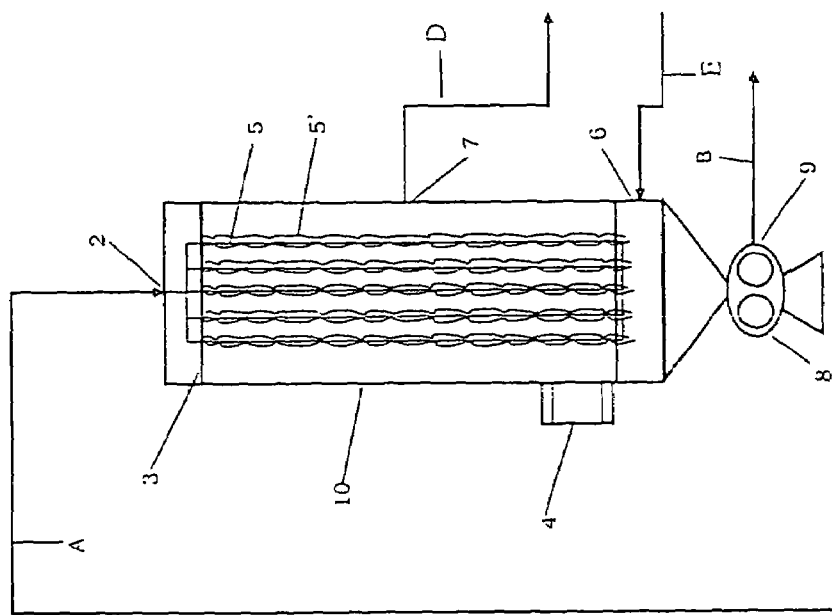
Figure 6:
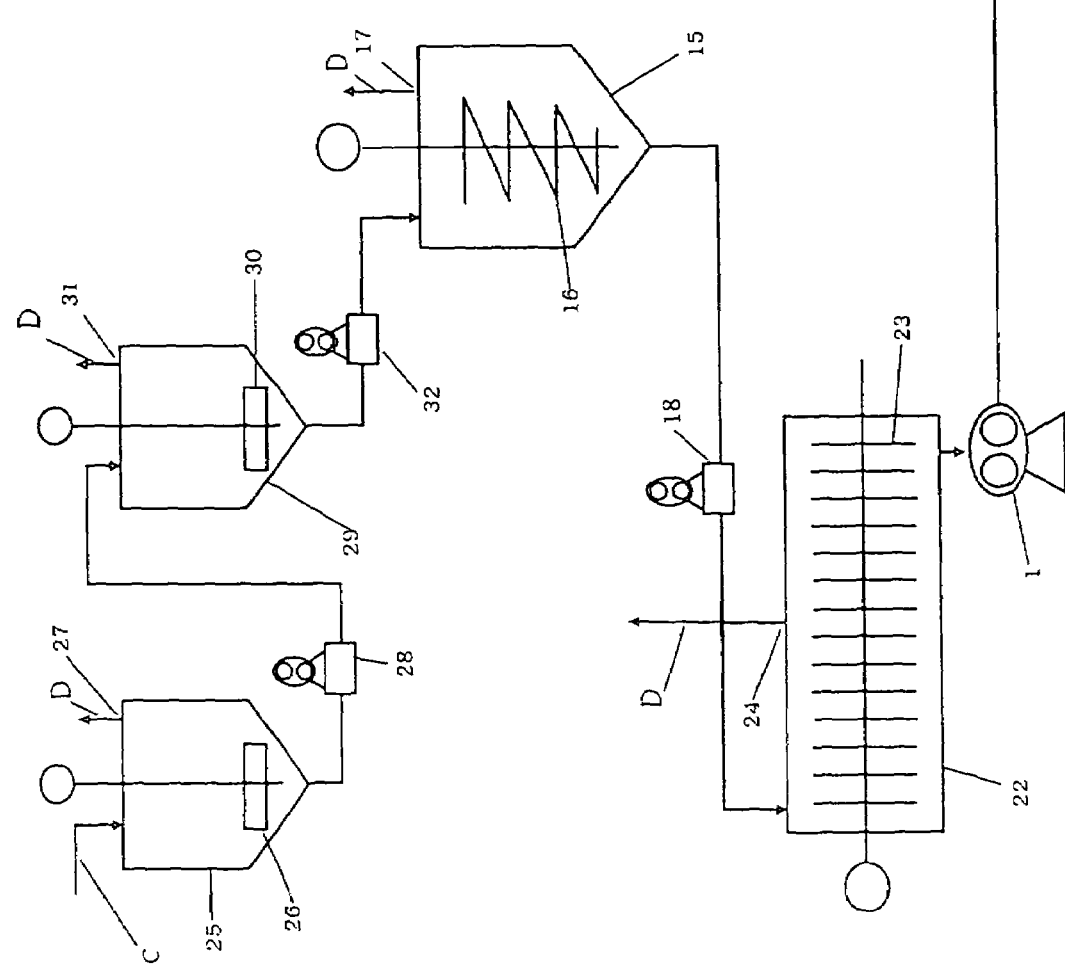

Each of FIGS. 5 and 6 shows an example of a system used for producing the PTT resin from DMT and TMG as raw materials. In each of FIGS. 5 and 6, mixture C of raw materials and a catalyst is charged into first transesterification reaction vessel 25, and the resultant reaction product is transferred to second transesterification reaction vessel 29. In each of first transesterification reaction vessel 25 and second transesterification reaction vessel 29, mixture C of raw materials is subjected to a transesterification reaction for a predetermined period of time, while stirring by means of agitation element (26 or 30), thereby obtaining BHPT. The atmosphere inside the reaction vessel is an atmosphere of inert gas, such as nitrogen gas, and/or an atmosphere containing methanol and/or TMG which are distilled from a reaction mixture in the reaction vessel. In general, the pressure inside the reaction vessel is controlled to approximately atmospheric pressure. The vent of each of the reaction vessels is connected to a fractionating column. TMG distilled from the fractionating column is recycled to the reaction vessel. Methanol and excessive nitrogen are discharged from the fractionating column. The obtained BHPT is subjected to polycondensation in the same manner as mentioned above in connection with the systems shown in FIGS. 3 and 4, thereby obtaining prepolymer A and then, PTT resin B.

BEST MODE FOR CARRYING OUT THE INVENTION

Hereinbelow, the present invention will be described in more detail with reference to the following Examples and Comparative Examples, which should not be construed as limiting the scope of the present invention.

In the following Examples and Comparative Examples, various measurements and analyses were conducted by the following methods.

(1) Intrinsic Viscosity [η]

Intrinsic viscosity [η] of a polymer (i.e., a prepolymer or a final polytrimethylene terephthalate resin) was measured by means of an Oswald viscometer. Specifically, with respect to each of o-chlorophenol solutions of a polymer, which have different concentrations [C] (g/100 ml) of the resin, the relative viscosity [ηsp] was measured at 35° C. The obtained (ηsp/C) values were plotted against the concentrations of the resin, and the resultant gradient is extrapolated into the zero (0) concentration to thereby obtain an intrinsic viscosity [η] of the polymer. That is, the intrinsic viscosity [η] of the polymer was calculated by the following formula:

$$[\eta] = \lim_{C \to 0} (\eta sp/C).$$

(2) Crystalline Melting Point

The crystalline melting point of a prepolymer was measured by means of a differential scanning calorimeter (trade name: Pyris 1; manufactured and sold by Perkin Elmer, Inc., U.S.A.) under the following conditions:

Measuring temperature: 0 to 280° C.

Rate of temperature elevation: 10° C./min

Specifically, a temperature at which an endothermic peak ascribed to the melting of a crystal is observed in the obtained differential scanning calorimetry (DSC) chart was defined as the crystalline melting point of the prepolymer, wherein the determination of the peak was conducted using an analytic software attached to the calorimeter.

(3) Terminal Carboxyl Group Content 1 g of a polymer (i.e., a prepolymer or a final polytrimethylene terephthalate resin) was dissolved in 25 ml of benzyl alcohol, followed by addition of 25 ml of chloroform, thereby obtaining a mixture. The obtained mixture was subjected to a titration with a 1/50 N solution of potassium hydroxide in benzyl alcohol. From the obtained titration value $V_A$ (ml) and a blank test value $V_0$ (ml) which is obtained by a titration conducted in the absence of the polymer, the terminal carboxyl group content was calculated by the following formula:

$$\text{Terminal carboxyl group content}(meq/kg) = (V_A - V_0) \times 20.$$

(4) Total Terminal Group Content

The total amount of terminal groups per kg of a sample is defined as the total terminal group content. Specifically, the total terminal group content (meq/kg) is calculated from the intrinsic viscosity [η] by the following formula:

$$\text{Total terminal group content}(meq/kg) =$$
$$1,000/(\text{polymerization degree} \times 206) \times 2 \times 1,000$$

wherein:

the ploymerization degree = intrinsic viscosity[η] × 144.6 − 26.2.

(5) Molecular Weight Distribution

The ratio of the weight average molecular weight (Mw) to the number average molecular weight (Mn) (Mw/Mn ratio) was used to evaluate the molecular weight distribution of a polytrimethylene terephthalate resin. The Mw and Mn of a polytrimethylene terephthalate resin were determined by gel permeation chromatography (GPC). Specifically, the GPC was conducted under the following conditions:

Apparatus: chromatograph model HLC-8120 (manufactured and sold by Tosoh Corporation, Japan);

Columns: HFIP804-803 (30 cm) (manufactured and sold by Showa Denko K. K., Japan) (×2);

Carrier: hexafluoroisopropanol;

Measurement temperature: 40° C.; and

Flow rate : 0.5 ml/min.

A calibration curve used in the determination of the Mn and Mw was obtained by using standard polymethyl methacrylate (PMMA) samples (manufactured and sold by Polymer Laboratories Ltd., U.K.). The molecular weights of the PMMA samples used were 620, 1,680, 3,805, 7,611, 13,934, 24,280, 62,591 and 186,000, respectively.

(6) Color (L-value and b*-value)

A pellet of a polytrimethylene terephthalate resin (PTT) was heated at 100° C. for 10 minutes to partially crystallize the pellet. The color (in terms of L-value and b*-value thereof) of the obtained partially crystallized pellet was measured by means of a color measuring computer (manufactured and sold by SUGA TEST INSTRUMENTS Co., Ltd., Japan).

Separately from the above, another pellet of PTT resin was heated at 180° C. for 24 hours, and then, the color thereof was measured in the same manner as mentioned above, except that the heating at 100° C. for partially crystallizing the PTT resin was not conducted since the pellet was already crystallized by the above-mentioned heating at 180° C. The thus obtained L-value and b*-value of the PTT resin were used as a yardstick of the discoloration of the PTT resin caused by the heating.

(7) Pellet Size

Approximately 2 g of pellets were used as sample pellets. The total weight of the sample pellets was accurately weighed, and the number of sample pellets was counted. From the total weight and the number of the sample pellets, the average weight of the pellets was calculated.

(8) Polymer Powder

The amount of polymer powder attached to the surface of pellets was measured as follows.
1. 1 kg of pellets were placed in a beaker filled with water.
2. The pellets in the beaker were stirred for 5 minutes to wash away the polymer powder from the surface of the pellets.
3. The contents of the beaker were filtered through a 30-mesh filter. Then, the pellets on the filter were repeatedly washed with water so that broken pieces of pellets and/or polymer powder would not remain on the pellets.
4. The resultant filtrate obtained in step 3 above was filtered again through a 300-mesh filter. The residue on the filter was dried at 80° C. under reduced pressure, namely, under a pressure of 1 kPa. The dried residue was weighed, and the measured weight was defined as the weight of the polymer powder.

(9) Crystallinity

The density of the pellets was measured in accordance with JIS-L-1013, in which the density of the pellets was measured by gradient density tube method in which a gradient density tube prepared using tetrachlorocarbon and n-heptanone was used. The measurement was conducted with respect to 10 pellets, and the average of the measured values was defined as the density of the pellets. Using the obtained value ($\rho_s$) of the density, the crystallinity of the pellets was calculated by the following formula:

$$X_c(\%) = \{\rho_c \times (\rho_s - \rho_a)\} / \{\rho_s \times (\rho_c - \rho_a)\} \times 100$$

wherein $\rho_a$ is 1.300 g/cm$^3$ which is an amorphous density of trimethylene terephthalate homopolymer, $\rho_c$ is 1.431 g/cm$^3$ which is a crystal density of trimethylene terephthalate homopolymer, and $\rho_s$ represents a density (g/cm$^3$) of the pellets.

EXAMPLE 1

Using the device as shown in FIG. 1, production of polytrimethylene terephthalate resin B was conducted as follows. A polytrimethylene terephthalate (PTT) prepolymer A having an intrinsic viscosity [η] of 0.5 dl/g, a terminal carboxyl group ratio of 7% and a crystalline melting point of 230° C. was fed through prepolymer feeding inlet 2 into polymerizer 10 by means of transferring pump 1. In polymerizer 10, PTT prepolymer A was caused to pass through the holes of perforated plate 3 in a molten form at 260° C. (temperature of the molten polymer) and at a rate of 10 g/min per hole, and then, was allowed to fall along and in contact with guides 5 at an atmospheric temperature of 260° C., which is the same as the temperature of the molten prepolymer (having passed through the holes of perforated plate 3), under reduced pressure, namely, under a pressure of 10 Pa, to thereby perform a polymerization to obtain PTT resin B. The obtained PTT resin B was withdrawn from outlet 9 by means of withdrawal pump 8. The perforated plate had a thickness of 50 mm and nine holes, each having a diameter of 1 mm, in which the holes of the perforated plate are arranged such that a checkered pattern is formed when lines connecting the holes are drawn on the surface of the perforated plate. The guide was a wire made of stainless steel, which wire had a circular cross-section, and had a diameter of 3 mm and a length of 5 m. Guides 5 were attached to perforated plate 4 so that each hole of perforated plate 5 had one guide 5 attached thereto. The withdrawal pump was operated while observing the polymer inside the polymerizer through observing window 4, so that almost no polymer was accumulated at the bottom of the polymerizer. (The above-mentioned prepolymer A contained titanium tetrabutoxide (polymerization catalyst) and trimethyl phosphate (stabilizer) in amounts of 0.1% by weight and 100 ppm by weight (in terms of the weight of phosphorus), respectively, both of which are based on the weight of the prepolymer.) The results are shown in Table 1.

In the above-mentioned polymerization, the retention time was 60 minutes. The retention time herein is a value calculated by dividing the total amount of the prepolymer and polymer inside the polymerizer by the feeding rate of the prepolymer.

With respect to the staining of the lower surface of the perforated plate, which was caused by the foaming of the prepolymer immediately below the holes of the perforated plate, the level of staining was low.

The obtained PTT resin had a high molecular weight, a narrow molecular weight distribution, a low terminal carboxyl group content, and excellent color. Further, the degree of discoloration of the obtained PTT resin occurring by heating was very small.

The obtained PTT resin was solidified in cool water having a temperature of 5° C., and then, cut into pellets, each having a weight of 20 mg. The amount of polymer powder (which had adhered to the pellets) was as low as 0.01% by weight, and the pellets had a crystallinity of 5%. Therefore, the obtained pellets were not easily broken and easy to handle.

EXAMPLES 2 TO 4

In each of Examples 2 to 4, polymerization was performed in substantially the same manner as in Example 1, except that polymerization was performed under the conditions indicated in Table 1. The results are shown in Table 1. In each of Examples 2 to 4, with respect to the staining of the lower surface of the perforated plate, which was caused by the foaming of the prepolymer immediately below the holes of the perforated plate, the level of staining was low. The obtained PTT resins had a high molecular weight, a narrow molecular weight distribution, a low terminal carboxyl group content, and excellent color. Further, with respect to each of the obtained PTT resins, the degree of discoloration occurring by heating was very small.

COMPARATIVE EXAMPLES 1 TO 4

In each of Comparative Examples 1 to 4, polymerization was performed in substantially the same manner as in Example 1, except that the polymerization was performed under the conditions indicated in Table 1. The results are shown in Table 1.

In Comparative Example 1, the temperature of the molten preploymer introduced into the polymerization reaction zone was too high, so that a vigorous foaming of the prepolymer occurred just below the holes of the perforated plate, thereby markedly staining the lower surface of the perforated plate. The obtained PTT resin was discolored to assume a yellow color and the color of the PTT resin thereof was non-uniform. Further, the PTT resin suffered severe discoloration by heating.

In Comparative Example 2, the temperature of the molten prepolymer introduced into the polymerization reaction zone was too low, so that the prepolymer was solidified, and hence, the prepolymer could not pass through the holes of the perforated plate.

In Comparative Example 3, the prepolymer had an intrinsic viscosity [η] of 0.18 dl/g, which was too low, so that a vigorous foaming of the prepolymer occurred just below the holes of the perforated plate, thereby markedly staining the lower surface of the perforated plate, and the inner wall of the polymerizer. The obtained PTT resin contained a large amount of black impurities (heat deterioration products). Further, the obtained PTT had a low molecular weight.

In Comparative Example 4, polymerization in the polymerizer was performed under atmospheric pressure. As a result, it was found that the polymerization degree of the obtained PTT was not increased, but rather lowered by the heat decomposition.

EXAMPLE 5

A polymerization was performed in substantially the same manner as in Example 1, except that the guide was changed to a jungle gym-like body, in which wires (each having a diameter of 3 mm) were three-dimensionally connected with one another at intervals of 30 mm as viewed in the vertical direction and at intervals of 50 mm as viewed in the horizontal direction. The upper end portions of the wires extending in the vertical direction were attached to the holes of the perforated plate. The results are shown in Table 1. With respect to the staining of the lower surface of the perforated plate, which was caused by the foaming of the prepolymer immediately below the holes of the perforated plate, the level of staining was low.

The obtained PTT resin had a high molecular weight, a narrow molecular weight distribution, and excellent color. Further, the degree of discoloration of the obtained PTT resin occurred even by heating.

EXAMPLE 6

Polymerization was performed in substantially the same manner as in Example 1, except that the guide was changed to a wire mesh, in which wires (each having a diameter of 3 mm) were two-dimensionally connected with one another at intervals of 30 mm as viewed in the vertical direction and at intervals of 50 mm as viewed in the horizontal direction. The upper end portions of the wires extending in the vertical direction were attached to the holes of the perforated plate. The results are shown in Table 1.

With respect to the staining of the lower surface of the perforated plate, which was caused by the foaming of the prepolymer immediately below the holes of the perforated plate, the level of staining was low.

The obtained PTT resin had a high molecular weight, a narrow molecular weight distribution, a low terminal carboxyl group content, and excellent color. Further, the degree of discoloration of the obtained PTT resin occurring by heating was very small.

EXAMPLE 7

Using the production system as shown in FIG. 3, 130 kg of a polytrimethylene terephthalate (PTT) resin was continuously produced per day, in which terephthalic acid and TMG were used as raw materials. With respect to the apparatuses used in the above-mentioned production system, each of esterification reaction vessel 11, first vertical agitation type polymerizer 15 and second vertical agitation type polymerizer 19 was a vertical agitation type polymerizer equipped with a stirrer having paddle-shaped agitation blades, and polymerizer 10 was the same as used in Example 5.

Specifically, production of the PTT resin was performed as follows. Terephthalic acid and TMG were mixed together (terephthalic acid/TMG molar ratio=1/1.5), followed by addition of 0.1% by weight of titanium tetrabutoxide, based on the weight of terephthalic acid, thereby obtaining a mixture (in the form of a slurry). The obtained mixture was continuously charged into esterification reaction vessel 11, and a polymerization was performed in substantially the same manner as in Example 1, except that the polymerization was performed under the conditions indicated in Tables 1 and 2, thereby obtaining a polytrimethylene terephthalate (PTT) resin. During the polymerization, trimethyl phosphate (stabilizer) was continuously added to first vertical agitation type polymerizer 15 in an amount of 20 ppm by weight, based on the weight of the polymer. The results are shown in Table 1.

The prepolymer which was fed into the final polymerizer satisfied the requirements of the present invention, and the obtained PTT resin had a high molecular weight, a narrow molecular weight distribution, a low terminal carboxyl group content, and excellent color. Further, the degree of discoloration of the obtained resin occurring by heating was very small.

EXAMPLE 8

Using the production system as shown in FIG. 4, 130 kg of a polytrimethylene terephthalate (PTT) resin was continuously produced per day, wherein terephthalic acid and TMG were used as raw materials. With respect to the apparatuses used in the above-mentioned production system, each of esterification reaction vessel 11 and first vertical agitation type polymerizer 15 was a vertical agitation type polymerizer equipped with a stirrer having paddle-shaped agitation blades; horizontal agitation type polymerizer 22 was equipped with a uniaxial stirrer having disc-shaped agitation blades; and polymerizer 10 was the same as used in Example 5.

Specifically, production of the PTT resin was performed as follows. Terephthalic acid and TMG were mixed together (terephthalic acid/TMG molar ratio=1/1.5), followed by addition of 0.1% by weight of titanium tetrabutoxide, based on the weight of terephthalic acid, thereby obtaining mixture C (in the form of a slurry). The obtained mixture C was continuously charged into esterification reaction vessel 11, and polymerization was performed in substantially the same manner as in Example 1, except that the polymerization was performed under the conditions indicated in Tables 1 and 3, thereby obtaining a polytrimethylene terephthalate (PTT) resin. During the polymerization, trimethyl phosphate (stabilizer) was continuously added to first vertical agitation type polymerizer 15 in an amount of 20 ppm by weight, based on the weight of the polymer. The results are shown in Table 1.

The prepolymer which was fed into the final polymerizer 10 satisfied the requirements of the present invention, and the obtained PTT resin had a high molecular weight, a narrow molecular weight distribution, a low terminal carboxyl group content, and excellent color. Further, the degree of discoloration of the obtained PTT resin occurring by heating was very small.

EXAMPLE 9

Using the production system as shown in FIG. 5, 130 kg of polytrimethylene terephthalate (PTT) resin was continuously produced per day, wherein DMT and TMG were used as raw materials. With respect to the apparatuses used in the above-mentioned production system, each of first transesterification reaction vessel 25 and second transesterification reaction vessel 29 was a vertical agitation type polymerizer equipped with a stirrer having turbine blades (26 or 30); each of first vertical agitation type polymerizer 15 and second vertical agitation type polymerizer 19 was equipped with a stirrer having paddle-shaped agitation blades (16 or 20); and polymerizer 10 was the same as the polymerizer used in Example 5, except that the number of holes of the perforated plate was changed to four (wherein the four holes were arranged such that a square is formed when lines connecting the holes are drawn on the surface of the perforated plate); the length of each guide 5 was changed to 9 m, and the length of the polymerizer casing was increased accordingly. During the operation of polymerizer 10, the prepolymer was caused to pass through the holes of the perforated plate at a rate of 23 g/min per hole.

Specifically, production of the PTT resin was performed as follows. DMT and a mixture of TMG and titanium tetrabutoxide (amount of titanium tetrabutoxide 0.1% by weight, based on the weight of DMT) (DMT/TMG molar ratio=1/1.5) were continuously charged into esterification reaction vessel 11, and polymerization was performed under the conditions indicated in Tables 1 and 4, thereby obtaining a polytrimethylene terephthalate (PTT) resin. During the polymerization, trimethyl phosphate (stabilizer) was continuously added to first vertical agitation type polymerizer 15 in an amount of 20 ppm by weight, based on the weight of the polymer. The results are shown in Table 1.

Prepolymer A which was fed into the final polymerizer 10 satisfied the requirements of the present invention, and the obtained PTT resin B had a high molecular weight, a narrow molecular weight distribution, a low terminal carboxyl group content, and excellent color. Further, the degree of discoloration of the obtained resin occurring by heating was very small.

The obtained polytrimethylene terephthalate resin was immersed in cool water having a temperature of 5° C. to thereby solidify the PTT resin. The solidified PTT resin was cut into pellets, each having a weight of 20 mg. The amount of polymer powder (which had adhered to the pellets) was as low as 0.01% by weight, and the pellets had a crystallinity as low as 5%. Therefore, the obtained pellets were not easily broken and easy to handle.

EXAMPLE 10

Polymerization was performed in substantially the same manner as in Example 9, except that nitrogen gas E was introduced through inlet 6 into polymerizer 10 in an amount indicated in Table 1, thereby obtaining a polytrimethylene terephthalate (PTT) resin (the conditions employed in this Example are indicated in Tables 1 and 4). The results are shown in Table 1.

Prepolymer A which was fed into the final polymerizer 10 satisfied the requirements of the present invention, and the obtained PTT resin B had a high molecular weight, a narrow molecular weight distribution, a low terminal carboxyl group content, and excellent color. Further, the degree of discoloration of the obtained resin occurring by heating was very small.

EXAMPLE 11

Polymerization was performed in substantially the same manner as in Example 9, except that the production system as shown in FIG. 6 was employed instead of the production system as shown in FIG. 5 (i.e., except that horizontal agitation type polymerizer 22 equipped with a uniaxial stirrer having disc-shaped agitation blades 23 was used instead of second vertical agitation type polymerizer 19), thereby obtaining a polytrimethylene terephthalate resin (the conditions employed in this Example are indicated in Tables 1 and 5). The results are shown in Table 1.

Prepolymer A which was fed into the final polymerizer 10 satisfied the requirements of the present invention, and the obtained PTT resin B had a high molecular weight, a narrow molecular weight distribution, a low terminal carboxyl group content, and excellent color. Further, the degree of discoloration of the obtained resin occurring by heating was very small.

EXAMPLE 12

Polymerization was performed in substantially the same manner as in Example 11, except that nitrogen gas E was introduced through inlet 6 into polymerizer 10 in an amount indicated in Table 1, thereby obtaining a polytrimethylene terephthalate (PTT) resin (the conditions employed in this Example are indicated in Tables 1 and 5).

Prepolymer A which was fed into the final polymerizer 10 satisfied the requirements of the present invention, and the obtained PTT resin B had a high molecular weight, a narrow molecular weight distribution, a low terminal carboxyl group content, and excellent color. Further, the degree of discoloration of the obtained resin occurring by heating was very small.

EXAMPLES 13 AND 14

In each of Examples 13 and 14, polymerization was performed in substantially the same manner as in Example 12 (in which the production system as shown in FIG. 6 was employed), except that, in Example 13, guides 5 provided in polymerizer 10 were changed to chains, each formed by the combination of elliptical rings (the diameter of a wire forming each ring was 3 mm; the major axis of the ellipse defined by each ring was 50 mm; and the curvature of each ring was 20 mmφ), and that, in Example 14, guides 5 provided in polymerizer 10 were changed to wires, each having a diameter of 5 mm and having welded thereto discs (each having a diameter of 20 mmφ and a thickness of 3 mm) at intervals of 200 mm in a manner such that the wire penetrates the center of each disc, thereby obtaining a polytrimethylene terephthalate resin (the conditions employed in these Examples are indicated in Tables 1 and 6). The results are shown in Table 1.

Prepolymer A which was fed into the final polymerizer 10 satisfied the requirements of the present invention, and the obtained PTT resin B had a high molecular weight, a narrow molecular weight distribution, a low terminal carboxyl group content, and excellent color. Further, the degree of discoloration of the obtained resin occurring by heating was very small.

COMPARATIVE EXAMPLE 5

The prepolymer obtained in Example 13 was immersed in cool water having a temperature of 5° C. to thereby solidify the prepolymer. The solidified prepolymer was then cut into pellets, and the pellets were dried at 120° C. in air. 100 kg of the dried pellets were charged into a 300 liter tumbling solid-phase polymerizer, and solid-phase polymerization was performed at 205° C. for 72 hours, while flowing nitrogen gas into the polymerizer at a rate of 100 liters/hr, thereby obtaining a polytrimethylene terephthalate (PTT) resin. The results are shown in Table 1.

The obtained PTT resin had a satisfactorily high molecular weight. However, the obtained resin had a broad molecular weight distribution. Further, the obtained pellets not only had attached thereto polymer powder in an amount as large as 1.0% by weight, but also had a crystallinity as high as 55%, and hence, the obtained pellet was brittle. If it is attempted to transfer the obtained pellets by means of a feeder or a pneumatic conveyer, the pellets would be broken, thereby forming a large amount of polymer powder.

COMPARATIVE EXAMPLE 6

Polymerization was performed in substantially the same manner as in Example 12, except that the amount of a polytrimethylene terephthalate resin produced per day was reduced to 75 kg, and that polymerizer 10 was not used, thereby obtaining a polytrimethylene terephthalate resin. The results are shown in Table 1.

The obtained PTT resin had a low polymerization degree, a broad molecular weight distribution and a high terminal carboxyl group content. Further, the degree of discoloration of the obtained resin occurring by heating was very large.

EXAMPLE 15

Polymerization was performed in substantially the same manner as in Example 1, except that the system as shown in FIG. 2 was employed in which inert gas was introduced into the polymerizer by means of inert gas absorption device N1, and that the polymerization was performed under the conditions indicated in Table 1. Perforated plate N4 provided in inert gas absorption device N1 had nine holes, each having a diameter of 1 mm, in which the holes of the perforated plate are arranged such that a checkered pattern is formed when lines connecting the holes are drawn on the surface of the perforated plate. Each of guides N5 used in inert gas absorption apparatus N1 was a wire made of stainless steel, which had a circular cross-section, and had a diameter of 5 mm and a length of 3 m. Guides N5 were attached to perforated plate N4 so that each hole of perforated plate N5 had one guide N5 attached thereto. Nitrogen gas E was fed into the gas absorption apparatus so that the internal pressure thereof was 0.11 Pa. Prepolymer N5' was allowed to fall along and in contact with guides N5 so as to cause the prepolymer to absorb and contain nitrogen gas. Transferring pump N7 was operated while observing the prepolymer inside the gas absorption apparatus through the observing window, so that almost no prepolymer was accumulated at the bottom of the gas absorption apparatus. Prepolymer A withdrawn from inert gas absorption apparatus N1 contained very small bubbles. After conducting the production of the PTT resin for a while in the above-mentioned manner, the feeding of nitrogen gas E into inert gas absorption apparatus N1 was stopped, and the difference in the internal pressure of inert gas absorption apparatus N1 before and after the stopping of the feeding of nitrogen gas was measured. As a result, it was found that the difference in the amount of nitrogen gas was 0.5 mg per gram of the prepolymer. This difference in the amount of nitrogen gas was defined as the amount of nitrogen gas which was absorbed by and contained in the prepolymer. Using the thus obtained amount of nitrogen gas absorbed by and contained in the prepolymer, the amount of nitrogen gas introduced into the polymerizer was calculated on the assumption that all nitrogen gas contained in the prepolymer was introduced into the polymerizer. The results are shown in Table 1. When the prepolymer falling in polymerizer 10 was observed through observing window 4, it was found that the prepolymer was in a foaming state and contained a large amount of bubbles. The resultant polytrimethylene terephthalate resin had a high molecular weight, a narrow molecular weight distribution and a low terminal carboxyl group content, and excellent color. Further, the degree of discoloration of the obtained resin occurring by heating was very small.

EXAMPLE 16

Polymerization was performed in substantially the same manner as in Example 9, except that the second vertical agitation type polymerizer was replaced by a free-fall polymerizer (which is the same as polymerizer 10 of FIG. 5 except that guides 5 were removed so that the prepolymer was caused to fall freely from the holes of perforated plate 3), thereby obtaining a polytrimethylene terephthalate resin (the conditions employed in this Example are indicated in Tables 1 and 4). The free-fall polymerizer was operated at 260° C. under a pressure of 100 Pa. The results are shown in Table 1.

Prepolymer A which was fed into the final polymerizer 10 satisfied the requirements of the present invention, and the obtained PTT resin B had a high molecular weight, a narrow molecular weight distribution, a low terminal carboxyl group content, and excellent color. Further, the degree of discoloration of the obtained resin occurring by heating was very small.

EXAMPLE 17

Polymerization was performed in substantially the same manner as in Example 9, except that the second vertical agitation type polymerizer was replaced by a thin film type polymerizer (which is the same as polymerizer 10 of FIG. 5 except that the perforated plate had 4 holes arranged in a line, and that a flat board is vertically provided as guide 5, so that prepolymer A is allowed to fall in the form of a film on the flat board), thereby obtaining a polytrimethylene terephthalate resin (the conditions employed in this Example are indicated in Tables 1 and 4). The thin film type polymerizer was operated at 260° C. under a pressure of 100 Pa. The results are shown in Table 1.

Prepolymer A which was fed into the final polymerizer 10 satisfied the requirements of the present invention, and the obtained PTT resin B had a high molecular weight, a narrow molecular weight distribution, a low terminal carboxyl group content, and excellent color. Further, the degree of discoloration of the obtained resin occurring by heating was very small.

TABLE 1

| | Property of prepolymer | | | | Polymerization conditions | | | | | | Property of polymer | | | | | Discoloration by heating | |
|---|---|---|---|---|---|---|---|---|---|---|---|---|---|---|---|---|---|
| | Intrinsic viscosity | COOH content | COOH ratio | c.m.p. | Polymerizer Guide | Temperature | Pressure | N₂ | State of polymerization | | Intrinsic viscosity | Mw/Mn | COOH content | Color | | Non-uniformity | Color |
| | | | | | | | | | Foaming | Staining | | | | | | | |
| | dl/g | meq/kg | % | °C. | | °C. | Pa | mg/g | | | dl/g | | meq/kg | b* | L* | | b* | L* |
| Ex. 1 | 0.50 | 15 | 7 | 230 | Wire | 260 | 10 | 0 | ○ | ○ | 1.10 | 2.3 | 14 | 3 | 90 | ○ | 8 | 88 |
| Ex. 2 | 0.70 | 25 | 19 | 228 | Wire | 260 | 10 | 0 | ○ | ○ | 1.20 | 2.3 | 17 | 5 | 91 | ○ | 11 | 89 |
| Ex. 3 | 0.50 | 15 | 7 | 230 | Wire | 240 | 10 | 0 | ○ | ○ | 0.90 | 2.2 | 6 | 1 | 87 | ○ | 4 | 87 |
| Ex. 4 | 0.50 | 15 | 7 | 230 | Wire | 260 | 100 | 0 | ○ | ○ | 0.85 | 2.2 | 8 | 3 | 90 | ○ | 9 | 90 |
| Ex. 5 | 0.50 | 15 | 7 | 230 | Lattice | 260 | 10 | 0 | ○ | ○ | 1.20 | 2.3 | 12 | 4 | 92 | ○ | 10 | 90 |
| Ex. 6 | 0.50 | 15 | 7 | 230 | Wire mesh | 260 | 10 | 0 | ○ | ○ | 1.15 | 2.3 | 14 | 4 | 92 | ○ | 10 | 91 |
| Ex. 7 | 0.40 | 7 | 2 | 228 | Wire | 260 | 20 | 0 | ○ | ○ | 1.10 | 2.3 | 10 | 3 | 90 | ○ | 9 | 89 |
| Ex. 8 | 0.80 | 20 | 18 | 228 | Wire | 260 | 20 | 0 | ○ | ○ | 1.20 | 2.4 | 14 | 5 | 90 | ○ | 12 | 87 |
| Ex. 9 | 0.45 | 9 | 4 | 230 | Lattice | 250 | 100 | 0 | ○ | ○ | 1.00 | 2.3 | 7 | 3 | 90 | ○ | 10 | 89 |
| Ex. 10 | 0.45 | 9 | 4 | 230 | Lattice | 250 | 100 | 4 | ○ | ○ | 1.30 | 2.4 | 8 | 7 | 88 | ○ | 11 | 85 |
| Ex. 11 | 0.60 | 14 | 9 | 230 | Lattice | 250 | 100 | 0 | ○ | ○ | 1.25 | 2.3 | 9 | 5 | 88 | ○ | 13 | 82 |
| Ex. 12 | 0.60 | 14 | 9 | 230 | Lattice | 250 | 100 | 4 | ○ | ○ | 1.40 | 2.4 | 14 | 8 | 85 | ○ | 14 | 80 |
| Ex. 13 | 0.70 | 18 | 14 | 230 | Disc | 250 | 100 | 0 | ○ | ○ | 1.25 | 2.3 | 15 | 5 | 88 | ○ | 15 | 80 |
| Ex. 14 | 0.70 | 18 | 14 | 230 | Chain | 250 | 100 | 0 | ○ | ○ | 1.30 | 2.3 | 12 | 5 | 88 | ○ | 14 | 80 |
| Comp. Ex. 1 | 0.50 | 15 | 7 | 230 | Wire | 290 | 10 | 0 | X | X | 0.70 | 2.6 | 20 | 16 | 88 | X | 22 | 81 |
| Comp. Ex. 2 | 0.50 | 15 | 7 | 230 | Wire | 220 | 10 | 0 | — | — | — | — | — | — | — | — | — | — |
| Comp. Ex. 3 | 0.18 | 1 | 0 | 232 | Wire | 260 | 10 | 0 | X | X | 0.35 | 3.2 | 5 | 2 | 93 | X | — | — |
| Comp. Ex. 4 | 0.50 | 15 | 7 | 230 | Wire | 260 | Atmospheric pressure | — | ○ | ○ | 0.45 | 2.2 | 50 | 9 | 86 | ○ | — | — |
| Comp. Ex. 5 | 0.60 | 14 | 9 | 228 | Solid-phase polymerization | — | — | — | — | — | 1.30 | 3.0 | 8 | 2 | 83 | ○ | 18 | 75 |
| Comp. Ex. 6 | 0.60 | 14 | 9 | 228 | — | — | — | — | — | — | 1.00 | 2.8 | 25 | 8 | 85 | ○ | 27 | 70 |
| Ex. 15 | 0.47 | 15 | 7 | 230 | Wire | 260 | 100 | 0.5 | 100 | ○ | 1.30 | 2.4 | 6 | 5 | 92 | ○ | 8 | 90 |
| Ex. 16 | 0.40 | 4 | 1 | 230 | Lattice | 250 | 100 | 0 | ○ | ○ | 1.10 | 2.3 | 7 | 3 | 90 | ○ | 9 | 89 |
| Ex. 17 | 0.60 | 16 | 10 | 230 | Lattice | 250 | 100 | 0 | ○ | ○ | 1.35 | 2.4 | 11 | 8 | 88 | ○ | 15 | 89 |

Notes:
COOH content: Terminal carboxyl group content (meq/kg).
COOH ratio: Terminal carboxyl group ratio (%) (terminal hydroxyl group content/total terminal group content × 100).
c.m.p.: Crystalline melting point.
N₂: Weight of nitrogen gas per gram of a polymer.
Foaming: ○: Vigorous foaming of the prepolynier was not observed.
X: Vigorous foaming of the prepolyrner was observed.
Staining: ○: The lower surface of the perforated plate and/or the inner wall of the polymerizer were not stained.
X: The lower surface of the perforated plate and/or the inner wall of the polymerizer were stained.
Non-uniformity: ○: The color of the polymer was uniform.
X: The color of the polymer was non-uniform.
Discoloration by heating: Discoloration as measured after heating at 180° C. for 24 hours.

TABLE 2

|  | Temperature °C. | Retention time min. | Degree of vacuum Pa | Intrinsic viscosity dl/g |
|---|---|---|---|---|
| Esterification reaction vessel | 230 | 200 | Atmospheric pressure | — |
| First vertical agitation type polymerizer | 250 | 60 | 40000 | 0.2 |
| Second vertical agitation type polymerizer | 255 | 60 | 2000 | See Table 1 |

Notes:
Intrinsic viscosity: The intrinsic viscosity of the products dis-charged from each of the reaction vessel and the polymerizers.

TABLE 3

|  | Temperature °C. | Retention time min. | Degree of vacuum Pa | Intrinsic viscosity dl/g |
|---|---|---|---|---|
| Esterification reaction vessel | 230 | 200 | Atmospheric pressure | — |
| First vertical agitation type polymerizer | 250 | 60 | 20000 | 0.3 |
| Horizontal agitation type polymerizer | 255 | 60 | 700 | See Table 1 |

Notes:
Intrinsic viscosity: The intrinsic viscosity of the products dis-charged from each of the reaction vessel and the polymerizers.

TABLE 4

|  | Temperature °C. | Retention time min. | Degree of vacuum Pa | Intrinsic viscosity dl/g |
|---|---|---|---|---|
| First transesterification reaction Vessel | 190 | 120 | Atmospheric pressure | — |
| Second transesterification reaction vessel | 220 | 120 | Atmospheric pressure | — |
| First vertical agitation type polymerizer | 255 | 60 | 1000 | 0.3 |
| Second vertical agitation type Polymerizer | 260 | 60 | 100 | See Table 1 |

Notes:
Intrinsic viscosity: The intrinsic viscosity of the products dis-charged from each of the reaction vessels and the polymerizers.

TABLE 5

|  | Temperature °C. | Retention time min. | Degree of vacuum Pa | Intrinsic viscosity dl/g |
|---|---|---|---|---|
| First transesterification reaction vessel | 190 | 120 | Atmospheric pressure | — |
| Second transesterification reaction vessel | 220 | 120 | Atmospheric pressure | — |
| First polycondensation reaction vessel | 255 | 60 | 1000 | 0.3 |
| Horizontal agitation type polymerizer | 260 | 60 | 100 | See Table 1 |

Notes:
Intrinsic viscosity: The intrinsic viscosity of the products dis-charged from each of the reaction vessels and the polymerizer.

TABLE 6

|  | Temperature °C. | Retention time min. | Degree of vacuum Pa | Intrinsic viscosity dl/g |
|---|---|---|---|---|
| First transesterification reaction vessel | 190 | 120 | Atmospheric pressure | — |
| Second transesterification reaction vessel | 220 | 120 | Atmospheric pressure | — |
| First poly-condensation reaction vessel | 255 | 60 | 500 | 0.35 |
| Horizontal agitation type polymerizer | 260 | 60 | 50 | See Table 1 |

Notes:
Intrinsic viscosity: The intrinsic viscosity of the products dis-charged from each of the reaction vessels and the polymerizer.

TABLE 7

|  | Temperature °C. | Retention time min. | Degree of vacuum Pa | Intrinsic viscosity dl/g |
|---|---|---|---|---|
| First transesterification reaction vessel | 180 | 180 | Atmospheric pressure | — |
| Second transesterification reaction vessel | 210 | 180 | Atmospheric pressure | — |
| First poly-condensation reaction vessel | 255 | 120 | 500 | 0.55 |
| Horizontal agitation type polymerizer | 260 | 120 | 50 | See Table 1 |

Notes:
Intrinsic viscosity: the intrinsic viscosity of the products dis-charged from each of the reaction vessels and the polynierizer.

INDUSTRIAL APPLICABILITY

The polytrimethylene terephthalate resin of the present invention can be stably produced on a commercial scale without performing solid-phase polymerization. Further, the polytrimethylene terephthalate resin of the present invention has an intrinsic viscosity within an appropriate range, a narrow molecular weight distribution, and excellent color, and hence, can advantageously be used for stably producing a fiber or shaped article which has high strength and excellent color on a commercial scale.

The invention claimed is:

1. A polytrimethylene terephthalate resin comprising:
90 to 100 mole % of trimethylene terephthalate recurring units, and
0 to 10 mole % of at least one monomer unit selected from the group consisting of monomer units obtained from comonomers which are other than the monomers used for forming said trimethylene terephthalate recurring units and which are copolymerizable with at least one of the monomers used for forming said trimethylene terephthalate recurring units,
said polytrimethylene terephthalate resin having the following characteristics (A) to (D):
(A) an intrinsic viscosity [η] of from 0.8 to 4.0 dl/g;
(B) a molecular weight distribution of from 2.0 to 2.7 in terms of the Mw/Mn ratio, wherein Mw represents the weight average molecular weight of said polytrimethylene terephthalate resin and Mn represents the number average molecular weight of said polytrimethylene terephthalate resin;
(C) a psychometric lightness L-value (L-1) of from 70 to 100 and a psychometric chroma b*-value (b*-1) of from −5 to 25; and
(D) a psychometric lightness L-value (L-2) of from 70 to 100 and a psychometric chroma b*-value (b*-2) of from −5 to 25 as measured after heating said polytrimethylene terephthalate resin at 180° C. for 24 hours in air.

2. The polytrimethylene terephthalate resin according to claim 1, wherein said polytrimethylene terephthalate resin has an intrinsic viscosity [η] of from 1.25 to 2.5 dl/g.

3. The polytrimethylene terephthalate resin according to claim 1, which has a terminal carboxyl group content of from 0 to 20 meq/kg.

4. The polytrimethylene terephthalate resin according to claim 1, which has a molecular weight distribution of from 2.0 to 2.6.

5. The polytrimethylene terephthalate resin of any one of claims 1 to 4, which is in the form of pellets.

6. The polytrimethylene terephthalate resin according to claim 5, wherein said pellets have an average weight of from 1 to 1000 mg per pellet, and wherein said pellets contains a powder of said polytrimethylene terephthalate resin in an amount of 0 to 0.5% by weight, based on the total weight of said pellets, which powder passes through a 30-mesh filter and does not pass through a 300-mesh filter.

7. The polytrimethylene terephthalate resin according to claim 5, wherein said pellets have a crystallinity ($X_c$) of 40% or less, wherein said crystallinity is defined by the following formula:

$$X_c(\%) = \{\rho_c \times (\rho_s - \rho_a)\} / \{\rho_a \times (\rho_c - \rho_a)\} \times 100$$

wherein $\rho_a$ is 1.300 g/cm$^3$ which is an amorphous density of trimethylene terephthalate homopolymer, $\rho_c$ is 1.431 g/cm$^3$ which is a crystal density of trimethylene terephthalate homopolymer, and $\rho_s$ represents a density (g/cm$^3$) of said pellets.

8. A method for producing a polytrimethylene terephthalate resin, which comprises:
(1) providing a molten form of a trimethylene terephthalate prepolymer comprising:
90 to 100 mole % of trimethylene terephthalate recurring units, and
0 to 10 mole % of at least one monomer unit selected from the group consisting of monomer units obtained from comonomers which are other than the monomers used for forming said trimethylene terephthalate recurring units and which are copolymerizable with at least one of the monomers used for forming said trimethylene terephthalate recurring units,
said trimethylene terephthalate prepolymer having an intrinsic viscosity [η] of from 0.2 to 2 dl/g, and
(2) polymerizing said molten form of a trimethylene terephthalate prepolymer at a temperature which is 5° C. or more higher than the crystalline melting point of said prepolymer but is not higher than 280° C. under reduced pressure by the guide-wetting fall process in which said prepolymer is allowed to fall along and in contact with the surface of a guide so that polymerization of said prepolymer is effected during the fall thereof.

9. The method according to claim 8, wherein said molten prepolymer is continuously fed to a polymerization reaction zone for effecting the polymerization of said prepolymer in said step (2) and the resultant polytrimethylene terephthalate resin produced in said step (2) is continuously withdrawn from said polymerization zone, so that said step (2) for prepolymer polymerization is continuously performed.

10. The method according to claim 8, wherein said guide has at least one portion selected from the group consisting of a concave portion, a convex portion and a perforated portion.

11. The method according to claim 8, wherein said prepolymer falling along and in contact with the surface of said guide is in a foaming state.

12. The method according to claim 8, wherein the polymerization in said step (2) is performed, while introducing inert gas to said polymerization reaction zone.

13. The method according to claim 12, wherein the amount of said inert gas introduced to said polymerization reaction zone is in the range of from 00.5 to 100 mg per gram of said polytrimethylene terephthalate resin withdrawn from said polymerization reaction zone.

14. The method according to claim 12, wherein at least a part of said inert gas is introduced to said polymerization reaction zone in a manner wherein the introduction of the part of said gas is conducted separately from the feeding of the trimethylene terephthalate prepolymer to the polymerization reaction zone.

15. The method according to claim 12, wherein at least a part of said inert gas is introduced to said polymerization reaction zone in such a form as absorbed or contained in said trimethylene terephthalate prepolymer.

16. The method according to claim 8, wherein said prepolymer has an intrinsic viscosity [η] of from 0.5 to 2.0 dl/g and a terminal carboxyl group ratio of 50% or less in terms of the molar ratio (%) of the terminal carboxyl groups of the prepolymer to all terminal groups of the prepolymer.

17. The method according to claim 8, wherein said prepolymer is produced by at least one polymerization method selected from the following methods (a) to (d):
(a) a polymerization method using a vertical agitation type polymerizer;

(b) a polymerization method using a horizontal agitation type polymerizer;
(c) a polymerization method using a free-fall polymerizer having a perforated plate; and
(d) a polymerization method using a thin film type polymerizer.

18. The method according to claim 17, wherein said prepolymer is produced by said method (b).

19. A polytrimethylene terephthalate resin produced by the method of any one of claims 8 to 18.

20. A polytrimethylene terephthalate resin produced by a process comprising:
   providing a molten form of a trimethylene terephthalate prepolymer comprising:
      90 to 100 mole % of trimethylene terephthalate recurring units, and
      0 to 10 mole % of at least one monomer unit selected from the group consisting of monomer units obtained from comonomers which are other then the monomers used for forming said trimethylene terephthalate recurring units and which are copolymerizable with at least one of the monomers used for forming said trimethylene terephthalate recurring units; and
   polymerizing sold molten form of a trirnethylene terephihalate prepolymer by the guide-wetting fall process in which said prepolymer is allowed to fall along and in contact With the surface of a guide so that polymerization of said prepolymer is effected during the fall thereof,
   wherein the polytrimethylene terephthalate resin has a molecular weight distribution of from 2.0 to 2.7 in terms of the Mw/Mn ratio, wherein Mw represents the weight average molecular weight of said polytrimethylene terephthalate resin and Mn represents the number average molecular weight of said polytrimethylene terephthalate resin.

* * * * *

UNITED STATES PATENT AND TRADEMARK OFFICE
CERTIFICATE OF CORRECTION

PATENT NO. : 7,198,846 B2
APPLICATION NO. : 10/512467
DATED : April 3, 2007
INVENTOR(S) : Katsuhiro Fujimoto et al.

It is certified that error appears in the above-identified patent and that said Letters Patent is hereby corrected as shown below:

Column 49, Line 61, change "$X_c(\%)=\{\rho_c x(\rho_s-\rho_a)\}/\{\rho_a x(\rho_c-\rho_a)\}x100$" to --$X_c(\%)=\{\rho_c x(\rho_s-\rho_a)\}/\{\rho_s x(\rho_c-\rho_a)\}x100$--.

Column 51, Line 19, change "then" to --than--.

Column 52, Line 1, change "copolyrnerizable" to --copolymerizable--.

Column 52, Line 5, change "sold" to --said--.

Column 52, Line 5, change "trirnethylene terephilhalate" to --trimethylene terephthalate--.

Column 52, Line 8, change "With" to --with--.

Signed and Sealed this

Twenty-fourth Day of July, 2007

JON W. DUDAS
*Director of the United States Patent and Trademark Office*